United States Patent
Lelo et al.

(10) Patent No.: US 11,205,351 B2
(45) Date of Patent: Dec. 21, 2021

(54) DYNAMICALLY CONTROLLING PROGRAM FLOW OF A TESTING APPLICATION

(71) Applicant: Western Governors University, Salt Lake City, UT (US)

(72) Inventors: Adel Lelo, Salt Lake City, UT (US); Lan Nguyen-Vo, Clearwater, FL (US); Gina Fabbro, Salt Lake City, UT (US)

(73) Assignee: WESTERN GOVERNORS UNIVERSITY, Salt Lake City, UT (US)

( * ) Notice: Subject to any disclaimer, the term of this patent is extended or adjusted under 35 U.S.C. 154(b) by 0 days.

(21) Appl. No.: 16/702,226

(22) Filed: Dec. 3, 2019

(65) Prior Publication Data

US 2020/0175885 A1 Jun. 4, 2020

Related U.S. Application Data

(60) Provisional application No. 62/775,211, filed on Dec. 4, 2018.

(51) Int. Cl.
*G09B 7/00* (2006.01)
*G06F 3/0484* (2013.01)
*G06F 3/0482* (2013.01)

(52) U.S. Cl.
CPC ............. *G09B 7/00* (2013.01); *G06F 3/0482* (2013.01); *G06F 3/04847* (2013.01)

(58) Field of Classification Search
CPC ........................... G06F 3/0482; G06F 3/04847
See application file for complete search history.

(56) References Cited

U.S. PATENT DOCUMENTS

| | | | | | |
|---|---|---|---|---|---|
| 5,565,316 | A | * | 10/1996 | Kershaw | G09B 7/02 434/118 |
| 5,915,973 | A | * | 6/1999 | Hoehn-Saric | G09B 7/00 434/350 |

(Continued)

FOREIGN PATENT DOCUMENTS

JP 2003255816 A * 9/2003

OTHER PUBLICATIONS

"Test Administrators User Guide," Wyoming Department of Education, published on Mar. 21, 2018, and retrieved from https://wyoassessment.org/core/fileparse.php/2417/urlt/WY_TA_User_Guide.pdf on Jan. 28, 2021. (Year: 2018).*

*Primary Examiner* — Eric J. Bycer
(74) *Attorney, Agent, or Firm* — Workman Nydegger

(57) ABSTRACT

Improved techniques for dynamically controlling a program flow of a testing application. The testing application administers an exam on a user interface (UI). A state for each question is monitored, where the state includes a viewed, answered, or unviewed state. A question's state changes based on whether interaction is detected for that question. While the testing application is administering the exam, user input triggers a pause to the administration. A popup window is displayed to show a first list of instructions, a second list identifying exam questions having the "viewed" state, and a confirmation UI element. After the confirmation UI element is selected, the UI is modified by occluding the exam questions, by displaying a resume UI element, and by displaying a timing UI element. Later, the testing application continues the test's administration, but restricts access to certain questions.

20 Claims, 15 Drawing Sheets

---

TAKE A BREAK

Please review the following:

- Notify the proctor that you would like to take a break.
- You will not be able to view / modify any questions that you have already seen or answered.
- You can navigate and answer questions that have not been previously viewed.
- Your allotted time will not be paused during your break.
- Please note that your proctor will re-pan the area for your test session upon your return from your break.
- The following questions you have already viewed but not answered: 3, 7, 8, 14, 16
- The following questions you have already answered: 1, 2, 4, 6 — 235

☐ By checking this box, I have confirmed that I have read the statement above and would like to continue with taking a break.

Please check the above checkbox to continue with the "Break."

Yes   No

(56) References Cited

U.S. PATENT DOCUMENTS

| | | | | |
|---|---|---|---|---|
| 6,431,875 | B1* | 8/2002 | Elliott | G09B 7/00 434/118 |
| 2008/0133964 | A1* | 6/2008 | Rogers | G06F 11/2294 714/4.1 |
| 2009/0287514 | A1* | 11/2009 | West | G06Q 10/105 705/320 |
| 2011/0223576 | A1* | 9/2011 | Foster | G09B 7/02 434/362 |
| 2012/0208164 | A1* | 8/2012 | Hoda | G09B 7/04 434/350 |
| 2018/0131518 | A1* | 5/2018 | Scicchitano | H04L 9/32 |
| 2018/0225982 | A1* | 8/2018 | Jaeh | G09B 5/00 |

* cited by examiner

Popup Window
200

Visual Layout
205

TAKE A BREAK

Please review the following:

- Notify the proctor that you would like to take a break.
- You will not be able to view / modify any questions that you have already seen or answered.
- You can navigate and answer questions that have not been previously viewed.
- Your allotted time will not be paused during your break.
- Please note that your proctor will re-pan the area for your test session upon your return from your break.
- The following questions you have already viewed but not answered: 3, 7, 8, 14, 16    215

210

☐   By checking this box, I have confirmed that I have read the statement above and would like to continue with taking a break.

220

Please check the above checkbox to continue with the "Break."

| Yes | No |

TAKE A BREAK

Please review the following:

- Notify the proctor that you would like to take a break.
- You will not be able to view / modify any questions that you have already seen or answered.
- You can navigate and answer questions that have not been previously viewed.
- Your allotted time will not be paused during your break.
- Please note that your proctor will re-pan the area for your test session upon your return from your break.
- The following questions you have already viewed but not answered: 3, 7, 8, 14, 16
- The following questions you have already answered: 1, 2, 4, 6  — 235

☐ By checking this box, I have confirmed that I have read the statement above and would like to continue with taking a break.

Please check the above checkbox to continue with the "Break."

[ Yes ]   [ No ]

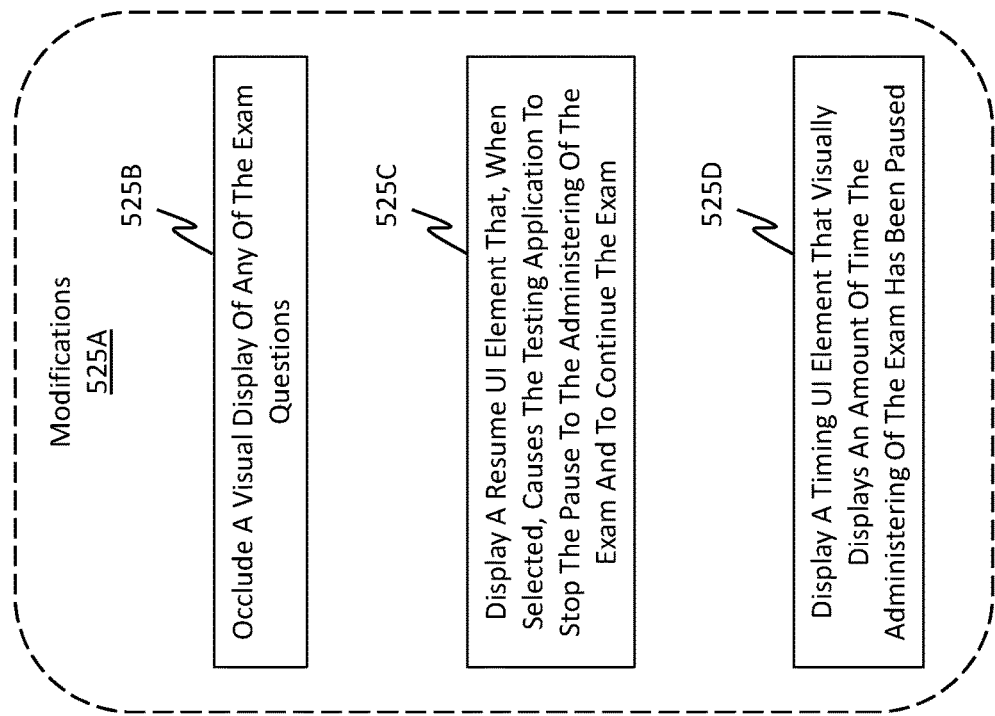
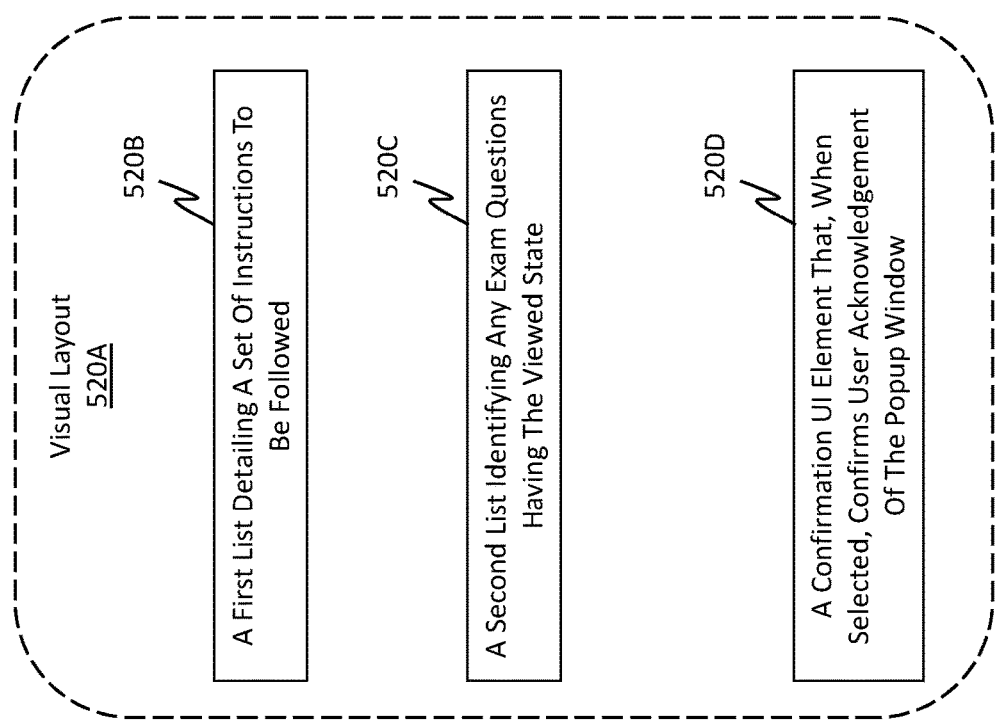
Figure 5C

DYNAMICALLY CONTROLLING PROGRAM FLOW OF A TESTING APPLICATION

CROSS-REFERENCE TO RELATED APPLICATIONS

This application claims the benefit of and priority to U.S. Provisional Patent Application Ser. No. 62/775,211 filed on Dec. 4, 2018 and entitled "A SYSTEM FOR ENABLING A TEST TAKER TO TAKE A BREAK IN A TEST WHILE MINIMIZING CHEATING," which application is expressly incorporated herein by reference in its entirety.

BACKGROUND

Computers and computing systems have affected nearly every aspect of modern living. Computers are generally involved in work, recreation, healthcare, transportation, entertainment, education, and even household management.

Educational institutions, including grade schools, colleges, universities, trade schools, and others, often rely on computing technology to assign homework, conduct lectures, and even proctor examinations. One major concern with using computers in the classroom or in remote/virtual/ online classrooms deals with the ease by which cheating may occur. For instance, computers are able to readily access the Internet, and if left unchecked, students may be tempted to improperly rely on Internet knowledge while taking an exam. Alternatively, if a student is taking a test in a remote location via a virtual proctor, the student may desire to step away from the test and look up the answer to a question, which the student has already seen and not answered.

Numerous different testing applications have been developed in an effort to restrict or substantially reduce the ability to cheat on an exam while using a computer. These applications often limit a computer's network capability (e.g., its connection to the Internet) or perhaps limit some of the other functions of the computer (e.g., cut, copy, paste, etc.). Although many different testing applications are available, these applications can still be improved because they still suffer from numerous deficiencies. What is needed, therefore, is an improved testing application or platform that is specifically designed to help reduce or eliminate the ability to cheat. What is also needed is an improved testing platform or application that helps a user better interact with the exam testing application. One will appreciate how the embodiments disclosed herein may be implemented in any type of learning environment, such as, for example, classrooms at a school or even virtual/remote learning environments, such as where a student takes a test in his/her own home using online proctoring services.

The subject matter claimed herein is not limited to embodiments that solve any disadvantages or that operate only in environments such as those described above. Rather, this background is provided to illustrate only one exemplary technology area where some embodiments described herein may be practiced.

BRIEF SUMMARY

The embodiments disclosed herein relate to systems, devices (e.g., hardware storage devices, wearable devices, etc.), and methods for dynamically controlling a program flow of a testing application that is being administered. By controlling the program flow of the testing application, the disclosed embodiments substantially reduce the ability to cheat while an exam is being administered. Additionally, the disclosed embodiments improve the user's interaction with a computer by providing clear instructions regarding how to use the testing platform or application.

In some embodiments, a testing application is executed. This application is configured to administer (e.g., using a user interface (UI)) an exam comprising multiple exam questions. A state for each of the exam questions is also monitored. This state includes one of (i) a viewed state, (ii) an answered state, or (iii) an unviewed state. The state for any particular exam question changes based on whether a user interaction is detected for that exam question. While the testing application is administering the exam, user input is received at the UI at a selectable UI element. This user input triggers a pause to the administration of the exam. In response to that input, a popup window is displayed, where this window is formatted to have a particular visual layout. Here, the layout includes (i) a first list detailing a set of instructions to be followed, (ii) a second list identifying any exam questions having the "viewed" state, and (iii) a confirmation UI element that, when selected, confirms user acknowledgement of the popup window. Subsequent to the confirmation UI element being selected, the UI is modified by occluding a visual display of any of the exam questions, by displaying a resume UI element that, when selected, causes the testing application to stop the pause and to resume the test, and by displaying a timing UI element that visually displays an amount of time the pause has lasted. Later, after the resume UI element is selected, the testing application stops the pause and continues the test's administration. Now, while the test is continued, exam questions that were listed in the second list (i.e. those having the viewed state) have their access restricted such that those exam questions are prevented from being answered.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIGS. 2A and 2B illustrate examples of a popup window that is selectively displayed when an interrupting operation is detected to interrupt or pause the administration/program flow of an exam.

FIGS. 4A, 4B, and 4C illustrate various examples of different UIs that may be displayed to visually indicate which exam questions are available for viewing and/or answering after an interruption to the program flow occurred.

FIGS. 5A, 5B, and 5C illustrate a flowchart of an example method for dynamically controlling a testing application's program flow and also illustrate various operations that may be performed to dynamically modify a UI of the testing application in response to certain user input.

DETAILED DESCRIPTION

Figure 1A:
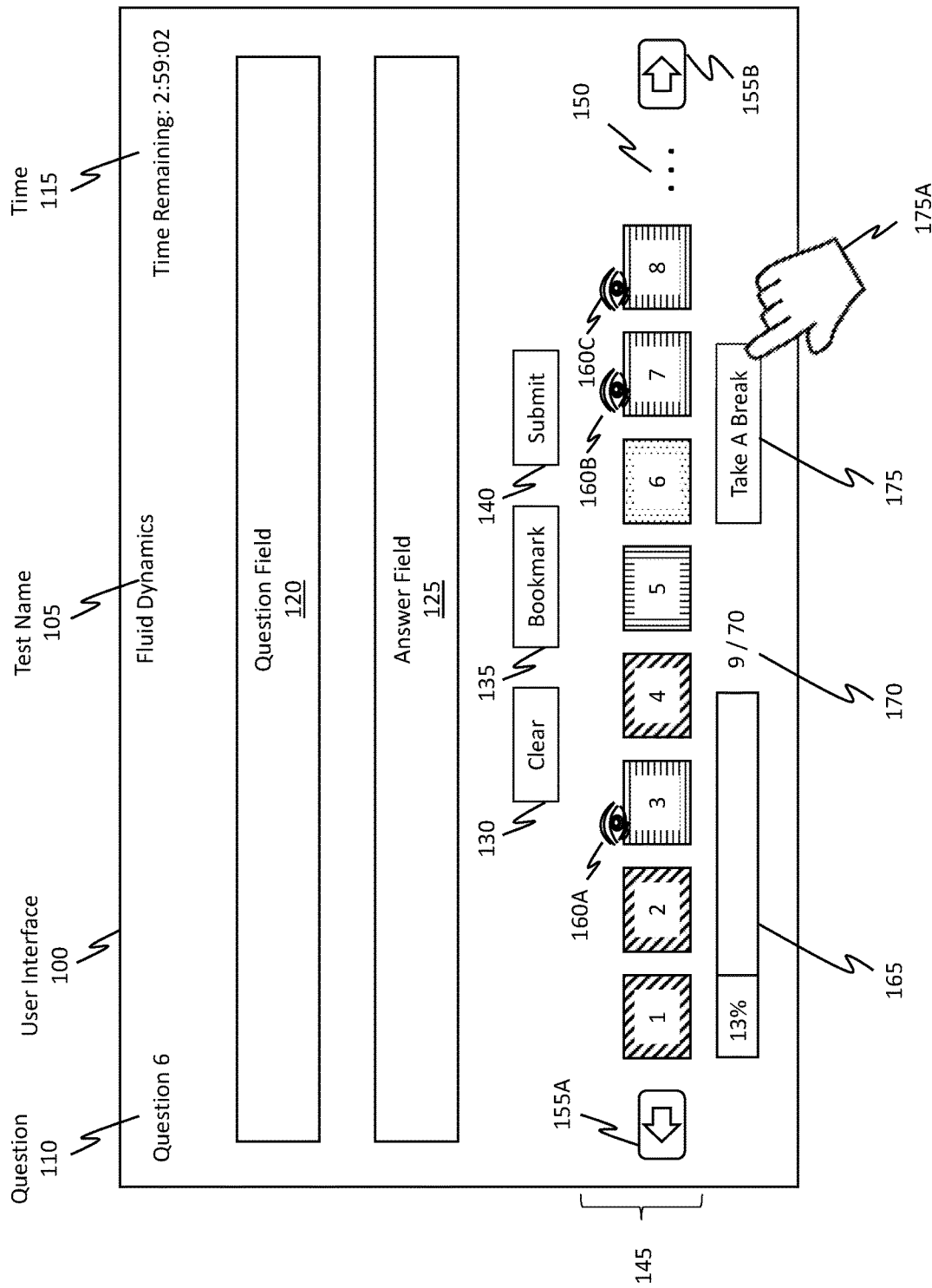
FIG. 1A illustrates an example testing application user interface (UI) that includes different UI elements for controlling a program flow of the testing application.

The embodiments disclosed herein relate to systems, devices (e.g., hardware storage devices, wearable devices, etc.), and methods for dynamically controlling a program flow of a testing application that is being administered. As used herein, "administering" an exam refers to a state in which the testing application has started (but not yet ended) an exam and is not currently paused. During this administering period, an answer to at least one question in the exam may be received within a user interface.

In some embodiments, a testing application administers an exam comprising multiple questions via use of a user interface (UI). A state for each question is monitored, where the state includes (i) a viewed state, (ii) an answered state, or (iii) an unviewed state. A question's state changes based on whether a user interaction is detected for that question. While the testing application is administering the exam, user input is received and triggers a pause to the administration. In response, a popup window is displayed, where the window includes (i) a first list detailing a set of instructions to be followed, (ii) a second list identifying any exam questions having the "viewed" state, and (iii) a confirmation UI element. After the confirmation UI element is selected, the UI is modified by occluding a visual display of any of the exam questions, by displaying a resume UI element, and by displaying a timing UI element that visually displays an amount of time the pause has lasted. After the resume UI element is selected, the testing application stops the pause and continues the test's administration. During this continued administration time period, exam questions that were listed in the second list are restricted and are prevented from being answered.

One will appreciate that any feature or operation of any embodiment disclosed herein may be combined with any other feature or operation of any other embodiment disclosed herein. That is, none of the disclosed embodiments are required to be mutually exclusive. Furthermore, any of the content disclosed in any of the figures may be combined with any of the other content disclosed in any of the other figures.

Additionally, the embodiments disclosed herein may be implemented in any type of classroom or testing environment. The phrase "classroom environment" or "testing environment" should be interpreted broadly to include any type of learning or testing environment, including traditional environments in which a student is seated in a brick and mortar classroom with an instructor and perhaps other students as well as remote environments in which a student may be alone or may be remote from the brick and mortal learning institution and the instructor. Additionally, or alternatively, the student may take the exam in a remote location (such as a home) while the test is being proctored or administered by a proctor who is also remotely located. For instance, the embodiments may be practiced in an online learning environment (or on behalf of an online learning institution) in which students may be remote from the instructor and possibly remote from one another. Again, the embodiments may be practiced in an online-facilitated testing environment in which the testing proctor (i.e. the individual proctoring the exam) is remote from the student. In some cases, the proctor may be local to the student, such as at a testing facility or a traditional classroom. Accordingly, one will appreciate how the embodiments may be practiced in any type of environment, including environments where a proctor is local or remote to a testing student. In some cases, online or remote proctoring including scenarios in which a human is not the proctor but rather a software application is the proctor, such as in automated online proctoring (as described in more detail later). Accordingly, all type of proctoring scenarios should be included in the disclosed embodiments, and the embodiments are not limited to human proctors.

Examples of Technical Benefits, Improvements, and Practical Applications

The following section outlines some example improvements and practical applications provided by the disclosed embodiments. It will be appreciated, however, that these are just examples only and that the embodiments are not limited to only these improvements.

The disclosed embodiments provide substantial benefits to the technical field in a number of ways. For instance, the embodiments substantially improve a user's interaction with a computer system and with a testing application in particular. Such improvements and benefits are achieved as a result of the disclosed user interface having a specialized, unique, and intuitive visual layout. That is, this visual layout is designed in a manner to assist a test take (i.e. a "user") in navigating the testing application and in controlling the computer system hosting the testing application. By providing the disclosed user interface, a user's interaction with a computer system is greatly improved.

The disclosed embodiments also provide an improved testing computer architecture. This architecture helps facilitate interaction between any number of computing devices, including a client or test taker's device and a proctor's computing device, to ensure that the administration of an exam is optimal and efficient. By controlling the program flow of the testing application and of the testing application's interaction with other networked computers (e.g., the proctor's computer), the embodiments help improve the operational flow of the architecture. Accordingly, substantial benefits may be achieved through practice of the disclosed principles. Of course, other benefits may be realized, as will be described throughout the remaining portions of this disclosure.

Improved User Interfaces (UI) for a Testing Application

Attention will now be directed to FIG. 1A, which illustrates an example user interface 100 that may be displayed as a part of the execution of a testing application. As used herein, a "testing application" should be interpreted broadly and generally refers to any type of software platform or application that is configured to administer a test, exam, quiz, or any type of evaluation under a set of restrictions or requirements. As will be described in more detail later, the testing application may be a locally installed application (e.g., installed on a local client or test taker's computer system), or it may be a remote application executing on a remote system (e.g., a cloud-based system).

User interface 100 is shown as including different visual elements or artifacts. For instance, user interface 100 may include a test name 105, which indicates the name of the test that is currently being administered. In some embodiments, the test name 105 may include additional information, such as the name of the course for which the exam is being administered or even the name of the professor or instructor who controls the class. Additionally, or alternatively, the test name 105 may include a timestamp representative of the current date and time. In some cases, a picture of the test taker may be displayed as well. By displaying a picture, a proctor walking around the testing area can examine the actual person sitting at the computer against the displayed picture to verify that the correct test taker is taking the exam.

User interface 100 is also shown as including a question 110, and specifically a number corresponding to question 110. Here, the number of question 110 is the number "6," meaning that the current question displayed on the user interface 100 is actually the sixth question of the exam. One will appreciate how an exam may include any number of questions (e.g., at least 1 question and potentially 2, 3, 4, 5, 6, 7, 8, 9, 10, 20, 30, 40, 50, 60, 70, 80, 90, 100, 200, or more than 200 questions or any range or combination therebetween). Indeed, any number of questions may be included within the exam. In the scenario depicted in FIG. 1A, the sixth question is currently being visually displayed.

User interface 100 additionally includes a time 115 indicating the amount of time the test has been active, or rather, the amount of time the test has been administered. In some cases, the time 115 may be unbounded such that the test taker is provided with an unlimited amount of time in which to take the exam. In other cases, the time 115 may be bounded, and the test taker has only a limited period of time in which to complete the exam. In this case, the test taker has a time remaining of 2:59:02 in which to complete the exam. If the limited period of time expires, then the test taker may be prevented from continuing to answer questions, and the test application may automatically submit any already-answered questions. In some cases, the time 115 may be a count-down timer where the count-down timer indicates an amount of time remaining until the testing application ends the exam. In the scenario of FIG. 1A, time 115 is currently shown as being a count down timer reflecting the amount of time that has already elapsed.

User interface 100 is currently displaying question 110, which is designed to have both a question field 120 and an answer field 125. The question field 120 will include text, pictures, graphs, illustrations, or any kind of content to present an exam question to a test taker. Typically, content included in the question field 120 is not modifiable by the test taker.

The answer field 125, on the other hand, provides an area in the user interface 100 in which the test taker is able to provide a response to the question presented in the question field 120. As such, content entered into the answer field 125 will be interpreted by the testing application as being an answer for the question displayed in the question field 120.

The answer entered into the answer field 125 may be dependent on the type of content presented in the question field 120. For instance, the answer field 125 may be formatted to receive text data, number data, graphical data, illustration data, or perhaps selection data (e.g., perhaps a number of radio buttons are displayed in the answer field 125, and the test taker is to select one of the radio buttons to provide his/her answer). One will appreciate how the answer field 125 may be formatted in any manner to receive a response from the test taker.

In accordance with the disclosed principles, the embodiments restrict, limit, or otherwise preclude the number of questions that are permitted to be displayed simultaneously with one another. In some cases, the embodiments are configured to allow only a single question field (e.g., question field 120) and a single answer field (e.g., answer field 125) to be presented to a test taker at any given time. In this scenario, multiple question and answer fields may be prevented from being displayed simultaneously with one another.

In some cases, however, the embodiments are configured to allow a selected number of question and answer fields to be displayed simultaneously with one another. In these embodiments, the test taker is provided with the option to view multiple questions concurrently with one another. Multiple answer fields may also be displayed in a concurrent manner, based on the number of questions that are displayed. Accordingly, some embodiments restrict the number of questions that are permitted to be presented to a test taker at any given time.

User interface 100 also includes a clear 130 user interface (UI) element. Clear 130 is selectable in response to any type of user input (e.g., a touch by a touch screen device, a point by a mouse or stylus, and so on). When selected, clear 130 causes input provided in the answer field 125 to be deleted, either in whole or in part. In some cases, selection of clear 130 triggers display of a warning to the test taker to confirm that the test taker actually is desirous to delete the contents in the answer field 125.

In some embodiments, a version history is maintained for content included in the answer field 125. The version history may be provided to enable a test taker to refer back to a previous version of the content he/she entered into the answer field 125. For instance, as input is entered into the answer field 125, a version record may be generated and recorded in a log or buffer. In some cases, the buffer is a ring buffer and the version records are maintained until such time as the ring buffer is full. When full, the oldest entries in the ring buffer will be overwritten by the newest entries in the ring buffer. Alternatively, there may be no limit to the number of version records. In some cases, the version records may be preserved or saved for a limited period of time, after which those version records are deleted. In other cases, the version records may be preserved throughout the entire duration of the exam. When the test taker finalizes his/her exam and ends the exam, then the version records may be deleted at that time. In any event, a version history may be provided to assist a test taker is providing an answer to a question.

User interface 100 additionally includes a bookmark 135 UI element. In some implementations, when bookmark 135 is selected via user input, the testing application flags the current question (e.g., if bookmark 135 were currently selected, then the testing application would flag the sixth question of the exam) or otherwise marks the question as being a question the test taker is desirous to return to at a later time. In some implementations, when bookmark 135 is selected, the testing application displays a popup window to present an option to the test taker, where the option allows the test taker to enter an amount of time that is permitted to elapse until a reminder prompt is visually displayed to the test taker.

By way of example, suppose a test taker selects bookmark 135. In response to that selection, the testing application may display a popup window with an instruction to the test taker telling the test taker to enter an amount of time (e.g., a selected number of seconds, minutes, or perhaps hours) that is permitted to elapse. Further suppose that after the test taker enters the amount of time, the test taker proceeds to a different question in the exam. When the amount of time eventually elapses, then the testing application may automatically trigger a reminder notification to the test taker informing him/her that the test taker was desirous to return to the bookmarked question. Additionally, in the event that the test taker attempts to finalize or end the exam prior to the amount of time ending, the testing application is able to prevent the finalization of the exam and instead trigger the reminder notification. In response, the test taker can either return to review the bookmarked question or, alternatively, the test taker can select an option to discard the reminder notification and proceed with finalizing and finishing the exam, in which case the bookmarked question may not be reviewed. The above description applies to a scenario in which the test taker has not taken a break, which will be described later. Instead, the above description relates to a reminding operation to remind the test taker that certain questions are still available to be answered. As will be described in more detail later, however, if the test taker views a question (but does not answer it) and then later takes a break, then that question will no longer be available for answering. On the other hand, if the test taker flags the question in the manner recited above (but does not take a break), then the test taker may return to answer the question prior to finalizing the exam.

In some embodiments, selection of bookmark 135 triggers a notetaking option for entering notes about the current question. When the test taker returns to the question, the notes may be displayed to the test taker.

User interface 100 also includes a submit 140 UI element. When selected, submit 140 causes content entered into the answer field 125 to be provided as the finalized answer to the question provided in the question field 120. In some cases, after selecting submit 140, the test taker may no longer be able to enter or modify content included in the answer field 125. As such, selection of submit 140 may operate as a permanent option for submitting an answer. In other embodiments, selection of submit 140 does not prevent a test taker from subsequently entering or modifying content in the answer field 125. Instead, only when the exam is finalized will the content in each answer field be recorded as a permanent answer.

User interface 100 also includes a navigation bar 145 displaying a number of selectable numbered UI elements. Each one of these selectable numbered UI elements corresponds to a particular question provided within the exam. By way of example, the navigation bar 145 is currently displaying a selectable numbered UI element for question 1 (e.g., see the box with the "1" inside), a selectable numbered UI element for question 2 (e.g., see the box with the "2" inside), a selectable numbered UI element for question 3 (e.g., see the box with the "3" inside), a selectable numbered UI element for question 4 (e.g., see the box with the "4" inside), a selectable numbered UI element for question 5 (e.g., see the box with the "5" inside), a selectable numbered UI element for question 6 (e.g., see the box with the "6" inside), a selectable numbered UI element for question 7 (e.g., see the box with the "7" inside), and a selectable numbered UI element for question 8 (e.g., see the box with the "8" inside). The ellipsis 150 represents how additional questions may be provided in the exam. Using the left selectable arrow 155A and the right selectable arrow 155B, the test taker is able to navigate to other selectable numbered UI elements that are not currently displayed in the navigation bar 145.

When a particular selectable numbered UI element is selected, the testing application causes the user interface 100 to be updated to visually display the corresponding question field and answer field for that question. By way of example, suppose the "1" selectable numbered UI element was selected. In response, the testing application will display question 1 and an answer field for question 1. If the "8" selectable numbered UI element was selected, then the testing application will transition, modify, or otherwise update the user interface 100 to now display question 8 and an answer field for question 8.

In some embodiments, different formatting may be provided for the different selectable numbered UI elements. For instance, elements "1," "2", and "4" all include the same formatting, as evidenced by the leftward slanted lines. Elements "3," "7," and "8" are all visually displayed as having the same formatting as evidenced by the horizontal lines. Element "5" has a unique formatting as evidenced by the vertical lines, and element "6" has another formatting as evidenced by the dotted pattern. Each of these different formats is representative of a state for the corresponding question. One will appreciate that the formatting may be set to any characteristic and that slanted, vertical, and horizontal lines are simply provided for example purposes only. In practice, any formatting technique may be used, including variations in color, intensity, boldness, line width, flashing, and so forth.

The formatting applied to elements 1, 2, and 4 indicates that questions 1, 2, and 4 have already been answered by the test taker. The formatting applied to questions 3, 7, and 8 indicates that questions 3, 7, and 8 have been viewed by the test taker but have not yet been answered. Not being "answered" includes at least two scenarios. As a first scenario, a test taker may have entered content into the answer field 125, but the test taker may not yet have selected submit 140. As a second scenario, a test taker may not have entered any content into the answer field 125. Both of these scenarios reflect a situation in which a question has not been answered. To "answer" a question, some embodiments require the submit 140 to be pressed by the test taker.

The formatting applied to element 5 indicates that question 5 has not been viewed (and thus could not have been answered) by the test taker. Finally, the formatting applied to element 6 indicates that the test taker is currently viewing question 6. Accordingly, different formatting may be applied to each of the different selectable numbered UI elements depending on a detected "state" or "status" of each one of the exam questions.

Figure 1B:
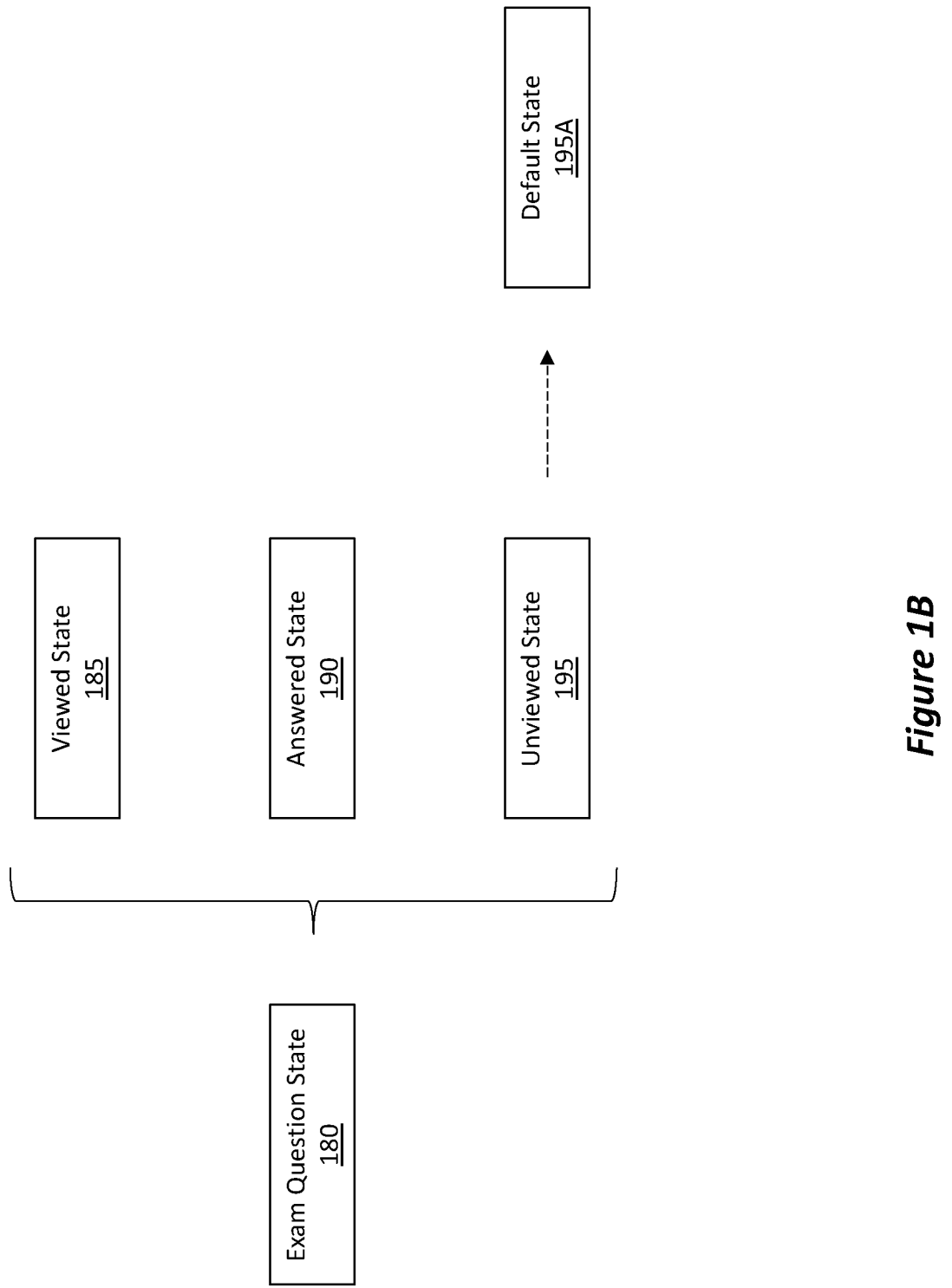
FIG. 1B illustrates different states that are attributed to each exam question of an exam administered by the testing application.

Turning briefly to FIG. 1B, this Figure provides additional details regarding different states that may be assigned or associated with each exam question. In particular, FIG. 1B shows an exam question state 180, which includes a viewed state 185, an answered state 190, and an unviewed state 195.

The viewed state 185 indicates that a particular exam question has been viewed but not yet answered. By "viewed" it is meant that the question field for that particular question has been visually displayed in the user interface. That is, even if a test taker may not have looked at the contents of the question field, the fact that the question field has been visually displayed will result in the question being marked as being "viewed" (i.e. the question's state will indicate it has been viewed).

The answered state 190 indicates that the particular exam question has both been viewed and answered. The unviewed state 195 indicates that the particular exam question has not yet been viewed (and thus could not have been answered). Initially (e.g., at the onset of the exam), each question is provided with the unviewed state 195, and a question's state does not change until such time as the test taker navigates to the question. In this regard, the default state 195A for each question is set to the unviewed state 195.

Returning to FIG. 1A, the visual formatting used to display each one of the selectable numbered UI elements corresponds to the state (as described in FIG. 1B) for each exam question. Of course, the states will change (and the formatting will be updated) as the test taker navigates and responds to each of the different exam questions.

In some cases, an additional UI element may be displayed to provide additional emphasis regarding questions having the "viewed" state. For instance, FIG. 1A shows how eye element 160A is displayed at a position proximate to element "3," eye element 160B is displayed at a position proximate to element "7," and eye element 160C is displayed at a position proximate to element "8." These eye elements 160A, 160B, and 160C may be used to provide additional emphasis to indicate that those particular questions have been viewed but have not yet been answered. In some embodiments, the eye elements 160A-160C are positioned as being at least partially overlapping with their corresponding selectable numbered UI elements. In some embodiments, the eye elements 160A-160C are positioned as being entirely overlapping with their corresponding selectable numbered UI elements. In some embodiments, the eye elements 160A-160C are positioned as being entirely non-overlapping with their corresponding selectable numbered UI elements but are positioned within a predetermined pixel distance from those elements.

Further details as to why these additional eye elements (or other types of emphasis elements or icons) is beneficial will be provided later, but by way of a brief introduction, if the test taker were to pause the administration of the exam, then questions marked as having the viewed state may not be accessible to the test taker when the test resumes. This restriction in access may be implemented in an effort to combat potential cheating. Therefore, to make the test taker firmly aware regarding the potential consequences of pausing the exam, the embodiments may beneficially provide additional visual cues or emphasis for questions having the "viewed" state.

Accordingly, embodiments disclosed herein configure the user interface 100 to visually display the navigation bar 145. This navigation bar 145 lists any number of selectable numbered UI elements, where each element corresponds to a question included in the exam. When any given selectable numbered UI element is selected, the testing application will cause the user interface 100 to visually display the question field and answer field for the corresponding question.

In this regard, the navigation bar 145 is provided to readily navigate between the different exam questions in an asynchronous manner (e.g., the test taker can transition from question 1 to question 8 without first having to answer questions 2 through 7). In some cases, selection of the left and right selectable arrows 155A and 155B causes only the selectable numbered UI elements in the navigation bar 145 to move so that new selectable numbered UI elements are displayed, but the testing application may not navigate to a particular question. In other words, manipulating the left and right selectable arrows 155A and 155B may not cause new questions to be visually displayed. Instead, a new question is displayed only upon selection of any one of the selectable numbered UI elements.

In some embodiments, selection of the left and right selectable arrows 155A and 155B may actually cause a new question (e.g., a new question field and answer field) to be visually displayed in an incremental manner (e.g., selection of the right selectable arrow 155B may cause the user interface 100 to transition from displaying question 6 to now displaying question 7, and selection of the left selectable arrow 155A may cause the user interface 100 to transition from displaying question 6 to now displaying question 5).

In some embodiments, the user interface 100 is configured to enable a test taker to simultaneously select multiple different selectable numbered UI elements. When multiple ones of these elements are selected, the questions corresponding to these elements may all be displayed in a simultaneous manner. In some embodiments, a limit or threshold on the number of elements that may be simultaneously selected is imposed, such that the test taker will be prevented from selecting more than the threshold number of elements and such that only a limited number of questions will be simultaneously displayed.

User interface 100 also includes a status bar 165 reflecting the percentage or amount of questions that have been answered. For instance, the status bar 165 currently shows how only 13% of the questions have been answered (i.e. only 13% of the questions have the "answered" state 190 from FIG. 1B). The status 170 shows a fraction indicating how many questions have been answered (e.g., 9 questions have been answered, including questions 1, 2, and 4) versus the total number of questions included in this particular exam (e.g., 70). Here, 9 divided by 70 corresponds to 13%, and 61 questions have not yet been answered, including questions 3, 5, 6, 7, and 8. Both questions having "viewed" and "unviewed" states are considered to be unanswered.

Accordingly, user interface 100 is shown as having a particular visual layout. This layout includes any number or combination of UI elements, as discussed above. Through use of this user interface 100, a test taker's interaction with the testing application and with the computer system itself will be improved because the test taker will have enhanced information regarding the states for each of the exam's questions. As will be described later, this user interface may also be used to dynamically control the program flow of the exam's administration (e.g., by enabling a test taker to pause the exam to take a break).

Another highly beneficial feature of the user interface 100 is the take a break 175 option. By selecting take a break 175 (e.g., as shown by selection or user interaction 175A), the embodiments cause the administration of the exam to be paused. Such a feature is beneficial in situations where the test take needs to use the restroom or for other situations in which a pause is desired or in which the test taker leaves the vicinity of the computer hosting the testing application.

One concern with allowing a test taker to walk away from the computer system hosting the testing application deals with the potential opportunity to cheat. For instance, consider a scenario where a test taker uses the restroom. Instead of actually using the restroom, the test taker may improperly consult the Internet or one of his/her text books. Upon returning to the exam, the test taker can then use his/her newfound knowledge to respond to questions. Such actions constitute cheating and should be prevented.

To help prevent cheating, the disclosed embodiments focus on an improved technique for dynamically controlling a program flow of the testing application. Selecting the take a break 175 initiates this dynamic control.

In particular, the embodiments still allow a test taker to pause the exam (e.g., by selecting the take a break 175), but the embodiments additionally perform one or more mitigation actions designed to help reduce the opportunity for a test taker to cheat. As will be described in more detail later, the embodiments restrict access to certain questions so as to prevent the test taker from being able to view and/or answer certain questions upon return from his/her break.

Accordingly, in some embodiments, the UI comprises a specific layout comprising a navigation bar (e.g., navigation bar 145) displaying selectable numbered UI elements (e.g., elements 1, 2, 3, 4, and so forth) corresponding to at least some (and potentially all) exam questions included in the exam. In some cases, a format for each displayed selectable numbered UI element reflects a particular state (e.g., viewed, unviewed, and answered) for a corresponding exam question. Additionally, a format for the "viewed" state is different than a format for the other states (e.g., the format for the answered state is different than a format for the unviewed state and is different than the format for the viewed state).

Take A Break

In response to selection of take a break 175, a new user interface (or popup window) may be presented on a display for the test taker to review. This new user interface is illustrated in FIG. 2A as the popup window 200.

Popup window 200 also includes a particular visual layout 205 depicting certain information. As shown by section 210, popup window 200 includes a list detailing a set of instructions. By way of example and without limitation, the list may include (but is not required to include) the following instructions, which the test taker should follow in order to proceed with pausing the administration of his/her exam:

(i) Notify the proctor that you would like to take a break.

(ii) You will not be able to view/modify any questions that you have already seen or answered.

(iii) You can navigate and answer questions that have not been previously viewed.

(iv) Your allotted time will not be paused during your break.

(v) Please note that your proctor may re-pan the area for your test session upon your return from your break.

These instructions (or any variant) are visually displayed to the test taker in popup window 200. In order for the test taker to pause the test's administration, the test taker is to follow each of the listed instructions. Of course, the instructions may vary from test to test, and the language currently provided in FIG. 2A and bullet points (i) through (v) are for example purposes only. For instance, as will be discussed in more detail later, it may be the case that the test taker is allowed to view questions that the test taker has already seen or answered, but the test taker may not be allowed to modify those questions, or rather the answers to those questions. Accordingly, any set of instructions may be provided to the test taker in section 210.

Popup window 200 may additionally display a list 215 identifying any specific exam questions having the "viewed" state. For instance, list 215 currently indicates that questions 3, 7, 8, 14, and 16 have the viewed state. With reference to FIG. 1A, user interface 100 shows how the formatting used to display elements 3, 7, and 8 visually illustrates how the questions corresponding to those elements (i.e. questions 3, 7, and 8) have been viewed. As an additional emphasis, the eye elements 160A, 160B, and 160C may also be displayed at positions proximate to those elements. By providing (i) a unique formatting, (ii) an additional UI element (e.g., the eye elements 160A-160C), and (iii) the list 215, the testing application is able to provide distinct visual cues regarding which questions may not be accessible after a test taker's break.

In some cases, the list 215 may have an additional visual emphasis applied to it. For instance, the numbers 3, 7, 8, 14, and 16 may be bolded, highlighted, flashing, colored (e.g., any color that is different from the color of the other text in the popup window 200), circled, shaded, and so forth. This emphasis is provided in an effort to draw the test taker's attention to the fact that access to the questions recited in list 215 will be restricted after the test taker returns from his/her break. As will be described in more detail later, restricted access includes, but is not limited to, restrictions on the ability to view and/or the ability to enter or modify content in that question's answer field.

For the test taker to proceed with his/her break, the test taker is to affirmatively indicate that he/she has reviewed the instructions in section 210 and the list 215 by selecting the check box 220. That is, by selecting the check box 220, the test taker is confirming that he/she has read the statements in the popup window 200 and would like to continue with taking a break. In some embodiments, selecting the check box 220 automatically triggers a message to the proctor's computer to inform the proctor the test taker would like to take a break.

In some cases, selecting the check box 220 automatically causes the testing application to pause its administration of the exam. In other cases, the test taker may be required to enter additional input at either the yes option 225 or the no option 230. Selection of the yes option 225 will trigger the testing application to pause its administration, while selection of the no option 230 will cause the testing application to continue its administration of the exam without a break. In some embodiments, selecting the yes option 225 automatically triggers a message to the proctor's computer to inform the proctor the test taker would like to take a break.

FIG. 2B illustrates the same popup window described in FIG. 2A, but with the inclusion of another list, namely list 235. List 235 details which questions the test taker has already answered. In this scenario, the test taker has already answered questions 1, 2, 4, and 6. In some cases, in addition to restricting access to the questions having the "viewed" state, the embodiments additionally restrict access to questions having the "answered" state. By restricting questions having the answered state, the embodiments help prevent test takers from being able to modify their responses after taking a break and thus help prevent cheating. Accordingly, in some embodiments, the popup window may include lists detailing which questions have the viewed state and which questions have the answered state. Both of these sets of questions may have restrictions imposed on them as a result of the test taker taking a break. Stated differently, in some embodiments, the visual layout of the popup window further includes a third list (e.g., list 235) identifying any exam questions having the answered state. Here, in addition to restricting access to the exam questions that were listed in the second list, access to the exam questions listed in the third list are also restricted. In some embodiments, a single list comprising both questions having the viewed state and questions having the answered state is displayed, as opposed to providing separate lists.

Figure 3A:
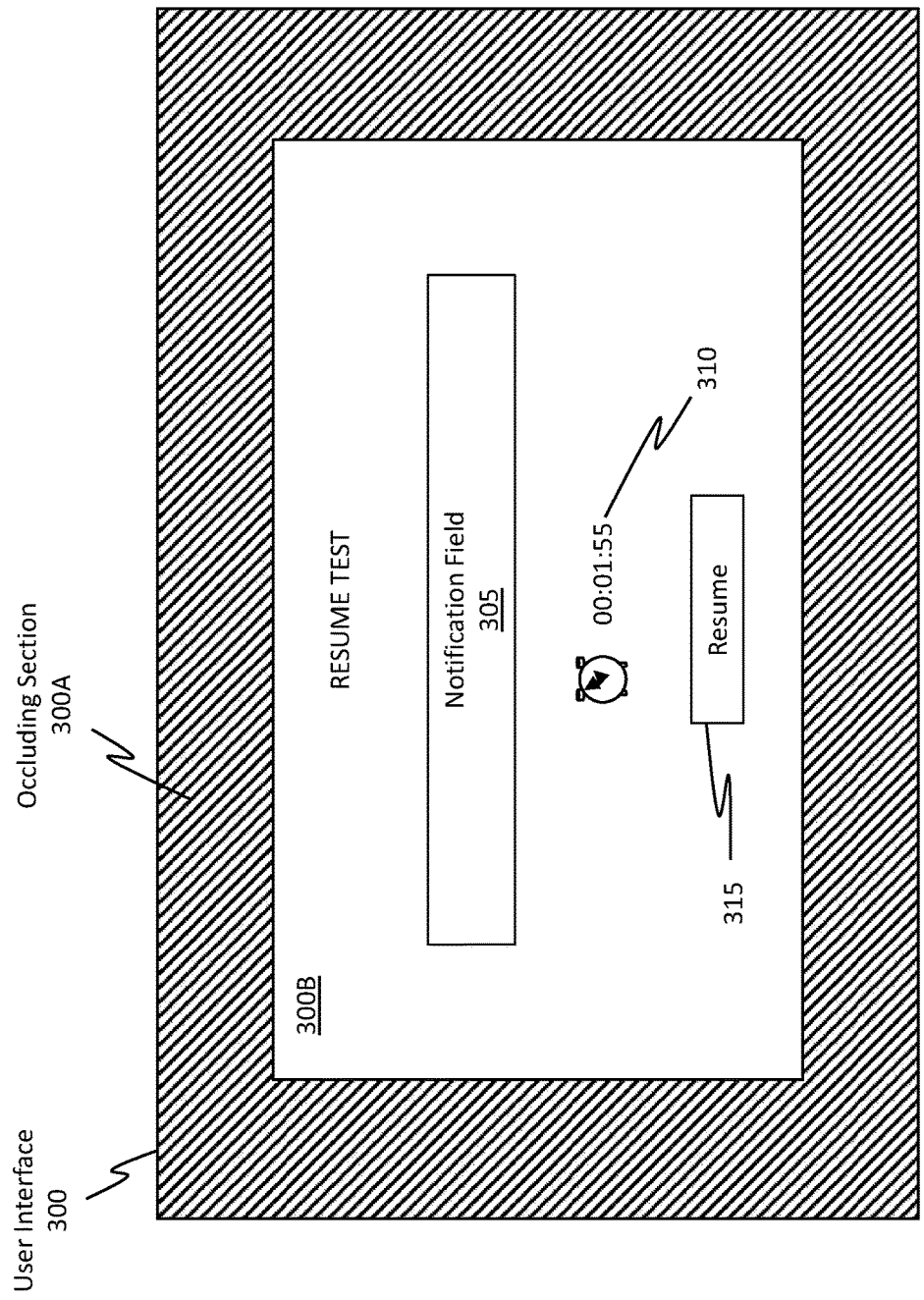
FIGS. 3A, 3B, 3C, and 3D illustrate different UIs and operational flows for controlling or influencing the program flow of the testing application.

FIG. 3A shows a user interface 300 that may be displayed in response to the test taker affirmatively indicating he/she would like to proceed with taking a break. That is, user interface 300 may be displayed in response to user input directed at either the check box 220 and/or the yes option 225 in FIG. 2A.

User interface 300 is representative of user interface 100 from FIG. 1A, but includes an occluding section 300A, which occludes exam information from being displayed. To clarify, occluding section 300A operates to prevent the content (e.g., the question and answer fields) that was previously displayed in user interface 100 from being displayed. The occluding section 300A helps prevent other test takers from looking at the original test taker's screen while the original test taker is taking his/her break.

User interface 300 is also shown as including an informative section 300B visually indicating that the testing application is currently paused in its administration of the exam. For instance, the informative section 300B is labeled as "RESUME TEST," indicating that the test is currently paused. In some cases, the informative section 300B may also include a notification field 305 that may include any kind of notification. As an example, notification field 305 may include a message from a proctor's computing device. As another example, notification field 305 may visually display the name of the test taker, the test taker's student number, or perhaps the number or name of the exam currently being administered. By displaying this information, the test taker will be able to readily identify his/her computing device upon returning from his/her break. Additionally, other test takers will be informed that this computing device does not belong to them. In some cases, notification field 305 may include a username and/or password requirement, the combination of which may be required to unlock the computing device so the test taker can proceed or continue with the exam.

User interface 300 also includes a timer 310. Timer 310 visually displays the amount of time the testing application has been paused. Often, timer 310 will begin or will be triggered as soon as the test taker affirmatively indicates he/she would like to take a break (e.g., in response to user input directed toward the UI elements), as described in FIG. 2A. If a proctor is walking around the examination room, then the timer 310 will inform the proctor how long the test taker has been away from the computing device. Additionally, or alternatively, if the proctor is located remotely to the test taker, the timing information of the timer 310 may be transmitted over a network connection to the proctor's computing device so the proctor will be made aware regarding the duration of the test taker's break. In the scenario shown in FIG. 3A, the timer 310 shows that 00:01:55 has elapsed since the break began.

In some implementations, an alarm or alert may be triggered at a periodic interval. For instance, an alert may be automatically transmitted to the proctor's computer device (e.g., from the test taker's device) at a periodic rate (e.g., perhaps every 5 minutes) to keep the proctor notified that the test taker has not yet returned to his/her exam.

User interface 300 also includes a resume 315 UI element. In response to selection of resume 315, the testing application will continue its administration of the exam. In some cases, the time 115 from FIG. 1A will continue to elapse even while the test taker is on his/her break. If the test has a limited time period in which it is permitted to be taken, then the time may still elapse even while the break is occurring. However, in other embodiments, taking a break stops the time 115.

Figure 3C:
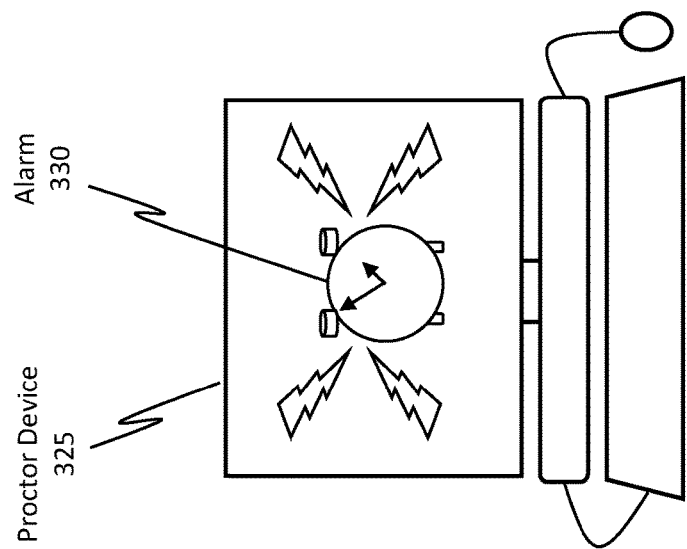
Figure 3B:
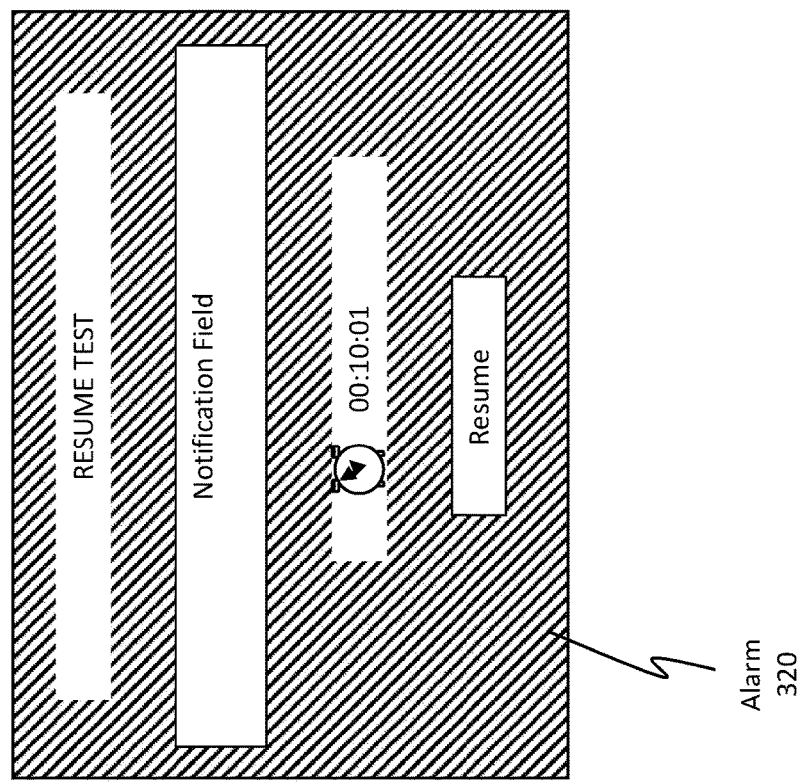

FIG. 3B shows a similar user interface as shown in FIG. 3A, but now the timer has reached a time of 00:10:01. In some embodiments, an alarm 320 may be triggered when the timer reaches a threshold timing value (e.g., perhaps every 10 minutes). Alarm 320 may cause the user interface to begin blinking, flashing, or changing colors. Alarm 320 may provide an indication to a proctor that the test taker has been away for a prolonged period of time.

FIG. 3C shows a proctor device 325 that a proctor of the exam may have. Proctor device 325 may be communicatively coupled to the test taker's computing device via a network connection. When alarm 320 is triggered, a corresponding alarm 330 or an alert may be triggered on the proctor device 325. These alarms may be synchronized with one another and may be triggered in response to a time of the timer reaching a particular timing value. The alarm 330 may be any type of alarm without limit. Examples of alarms include text or SMS messages, an email, a vibration, a sound, or a displayed notification. The alarm 330 may include the test taker's name, student number, the name of the test, the location of the test taker's computer, a picture of the test taker, and/or the amount of time of the break. Accordingly, some embodiments utilize alarms to notify proctors when test takers are away from their computers for a predetermined period of time.

Figure 3D:
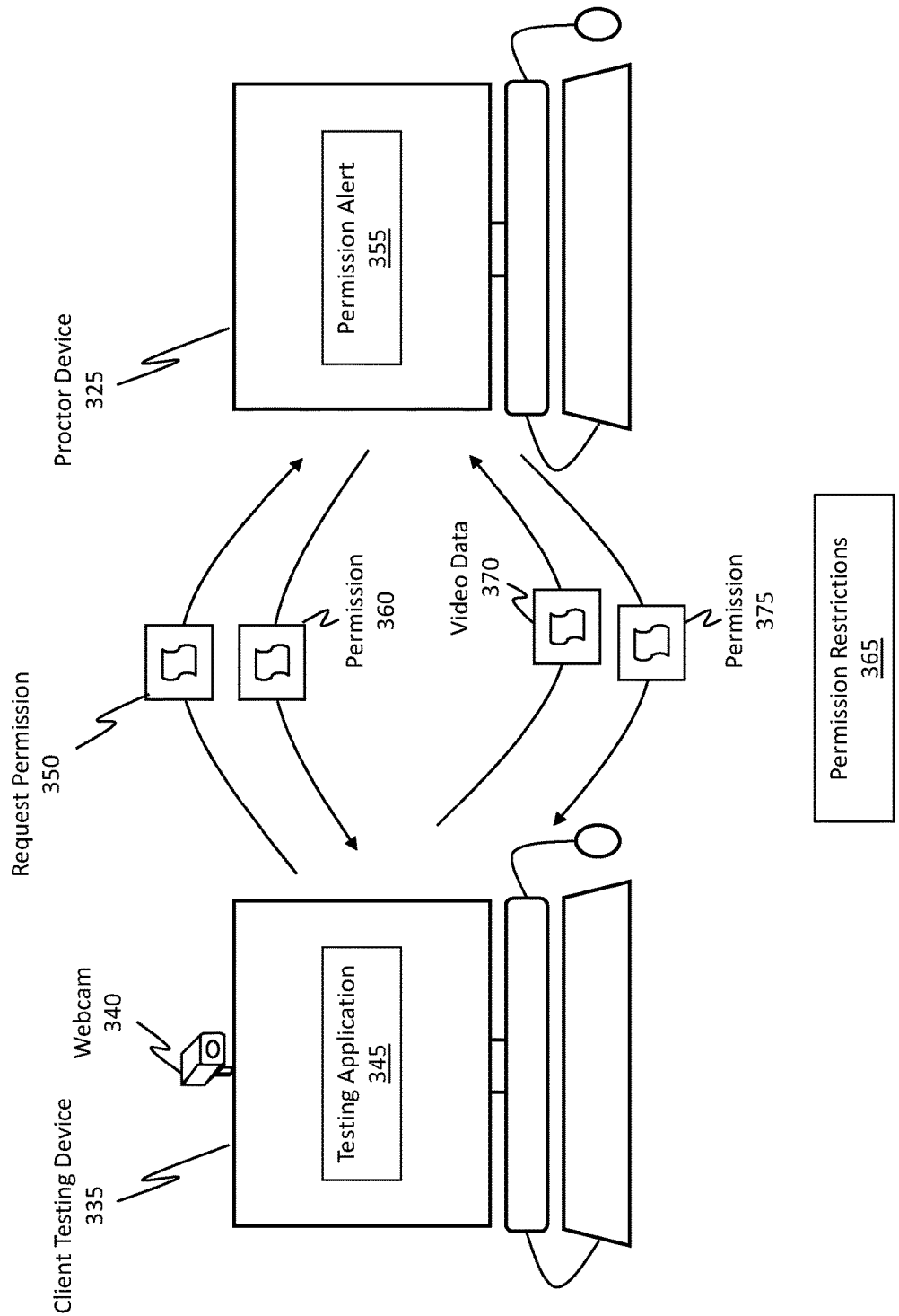

FIG. 3D illustrates a generalized flow diagram regarding operations that may be performed to trigger the testing application to pause its administration of the exam. FIG. 3D specifically, shows the proctor device 325, which was also shown in FIG. 3C, and a client testing device 335, which is hosting the disclosed testing application. In some cases, the client testing device 335 includes a webcam 340 configured to take either still images or video. When aimed at a person using client testing device 335 (e.g., the test taker), the webcam 340 is able to record actions of the test taker.

In some embodiments, the proctor device 325 is able to independently and asynchronously trigger activation of the webcam 340. In some cases, a notification may be displayed on the client testing device 335 that the webcam 340 is active and recording the test taker's actions. In other cases, the client testing device 335 may refrain or be prevented from providing a notification regarding when the webcam 340 is active. By permitting the proctor device 325 to control the webcam 340, the proctor may be provided with enhanced abilities to view and monitor the actions of the test taker. In some embodiments, the webcam 340 continuously records video throughout the entire duration of the exam's administration. The resulting video file may then be archived or stored with the test taker's answer and/or with the test taker's student portfolio file. This stored video file may then be used for auditing or review purposes.

As shown, client testing device 335 is hosting a testing application 345, which is representative of the testing applications discussed thus far and which is configured to display any of the user interfaces and popup windows discussed thus far. When a test taker desires to take a break, he/she will perform the actions described earlier in connection with FIGS. 1A through 2B. In some embodiments, permission from the proctor may be required before the test taker is allowed to take his/her break.

For instance, in response to the previous user interactions that were discussed in connection with FIGS. 1A through 2B, the testing application 345 may transmit a message to request permission 350 for the test taker to take a break. This message is transmitted to the proctor device 325. In response to that message, the proctor device 325 may trigger a permission alert 355 to be displayed on the proctor device 325. Permission alert 355 may include information indicating that the test taker would like to take a break and leave the area proximate to the client testing device 335. In some cases, permission alert 355 includes a text or SMS messages, an email, a vibration, a screen shake, a sound, or a displayed notification to capture the attention of the proctor. Permission alert 355 may also include information describing the test taker (e.g., his/her name, picture, location, test, student number, etc.).

In some cases, the permission alert 355 may automatically expire after a predetermined time period. If the proctor has not reviewed the permission alert 355 prior to its expiration, then the test taker may not be permitted to take a break. Alternatively, permission may automatically be granted if the proctor did not review the permission alert 355 in time.

Additionally, or alternatively, the proctor may provide user input to either provide or deny permission for the test taker to take a break. In some cases, the proctor may be aware of other test takers who are currently taking a break, and the proctor may not want the test taker to have the opportunity to talk to the other test takers. As such, the proctor may deny the break request.

If the proctor provides input indicating the permission is granted, the proctor device 325 transmits a message back to the client testing device 335 indicating permission 360 has been granted. In some cases, a notification is displayed on the client testing device 335 indicating permission 360 has been granted while in other cases the user interface 300 is automatically displayed without a notification indicating the permission 360.

In some cases, the proctor may stipulate one or more permission restrictions 365, which may be transmitted to the client testing device 335. Permission restrictions 365 may include restrictions on which activities or locations the test taker is permitted to engage in or go to while on his/her break. These permission restrictions 365 may be visually displayed in the notification field 305 of FIG. 3A. In some cases, the notification field 305 may also display a selectable option to confirm the test taker understands and will abide by the permission restrictions 365.

When the test taker finishes his/her break and selects the resume 315 in FIG. 3A, the testing application 345 may be triggered to reinitiate or recommence with the administration of the exam. In some implementations, prior to any question fields or answer fields being visually displayed, an additional verification operation may be required to be performed.

For instance, the testing application 345 may indicate that the area surrounding the client testing device 335 may be required to be scanned by the webcam 340 to verify that no contraband has been brought into the testing vicinity. While the webcam 340 is active, video data 370 may be transmitted to the proctor device 325 to enable the proctor to view the surrounding area of the client testing device 335. If the area is acceptable (e.g., free of contraband), then the proctor device 325 may issue permission 375 to permit the testing application 345 to proceed with administering the exam. If the area is not acceptable, then a notification may be sent to the client testing device 335 informing the test taker of the problem. Additionally, or alternatively, if the proctor identifies contraband, the proctor may unilaterally end the exam's administration. In some cases, the proctor may flag the test taker's exam (e.g., raise a flag in the metadata of the exam) as being one requiring additional academic review.

As described earlier, the embodiments may be practiced in any type of learning or testing environment, including environments where a student is local to a testing proctor and where a student is remote from the testing proctor. When the student is remotely located relative to the proctor, the proctor is able to use the webcam 340 to help facilitate the administration of the exam as well as to perform any of the operations disclosed above (e.g., remotely monitor or watch the student). In fact, even when the proctor is located locally relative to the student, the proctor may still use the webcam 340 to monitor the student (e.g., perhaps the proctor is sitting at his/her desk and can remotely monitor the student even though the proctor is physically near the student). Accordingly, it will be appreciated how the embodiments may be practiced in both online learning or testing environments and in local learning or testing environments (e.g., brick and mortar environments), without limit.

The embodiments may also be practiced in scenarios involving automated or computer proctoring. That is, instead of a human proctoring the exam, a software program may be used as the proctor. The software may be designed in any manner and may include any type of artificial intelligence or machine learning. Here, the program is able to operate in the role of the proctor to ensure cheating does not occur. In some cases, online or computer proctoring is conducted using a web conference connection, where the webcam is used to allow the proctor (either a human or a software program) to observe the test taker in the manner described throughout this disclosure.

User Interfaces That Are Displayed After A Break

Figure 4A:
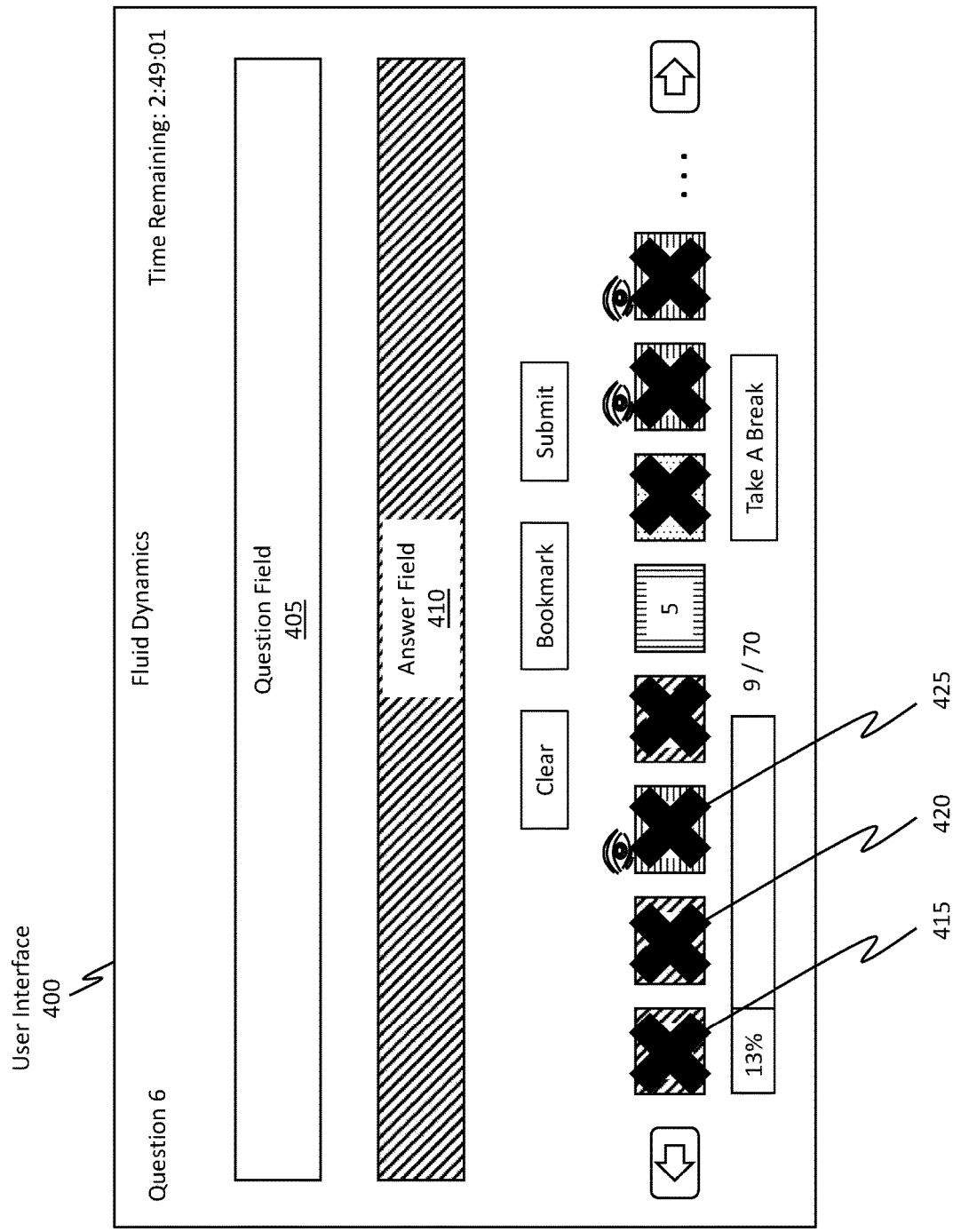
Figure 4B:
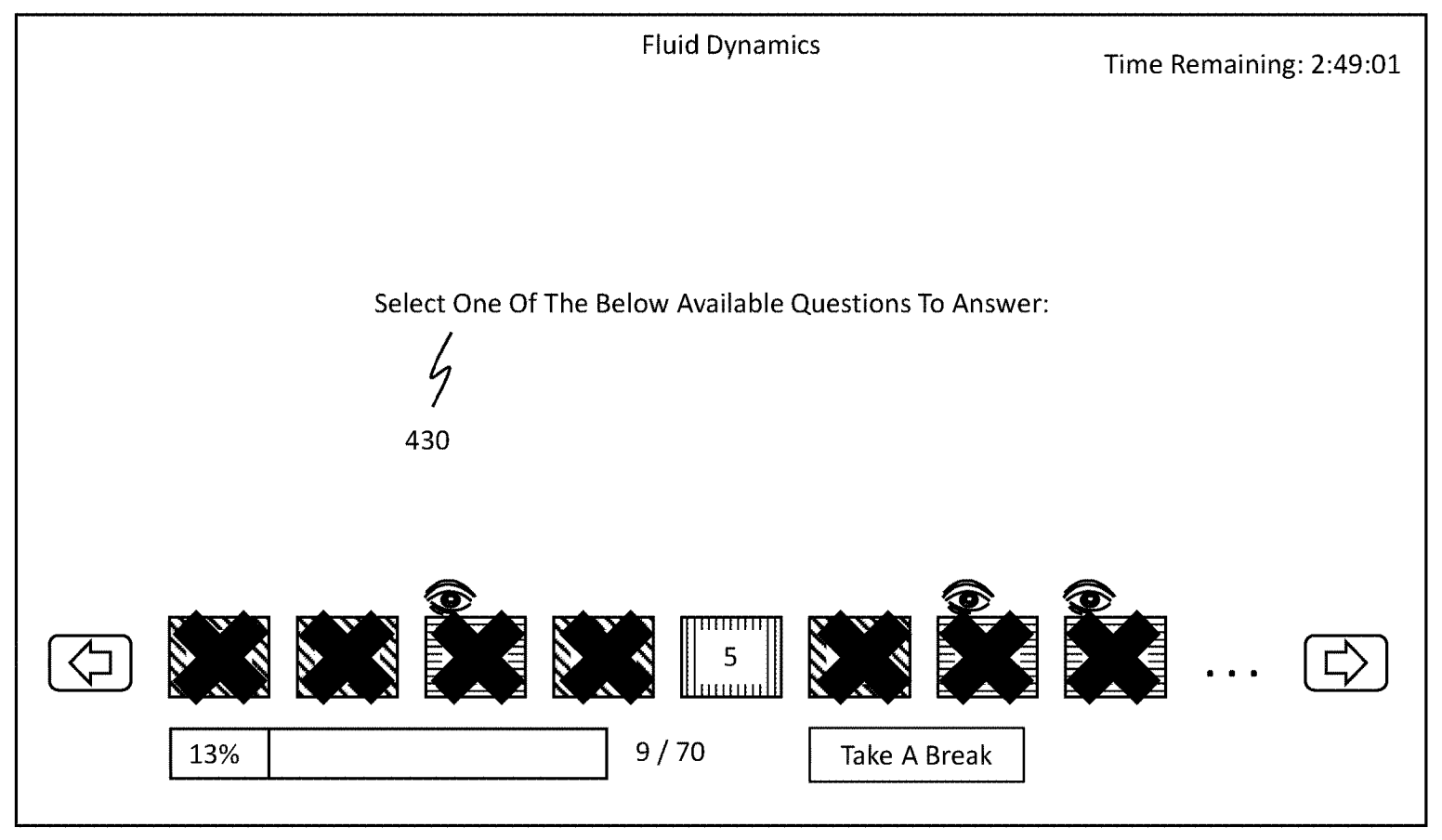
Figure 4C:
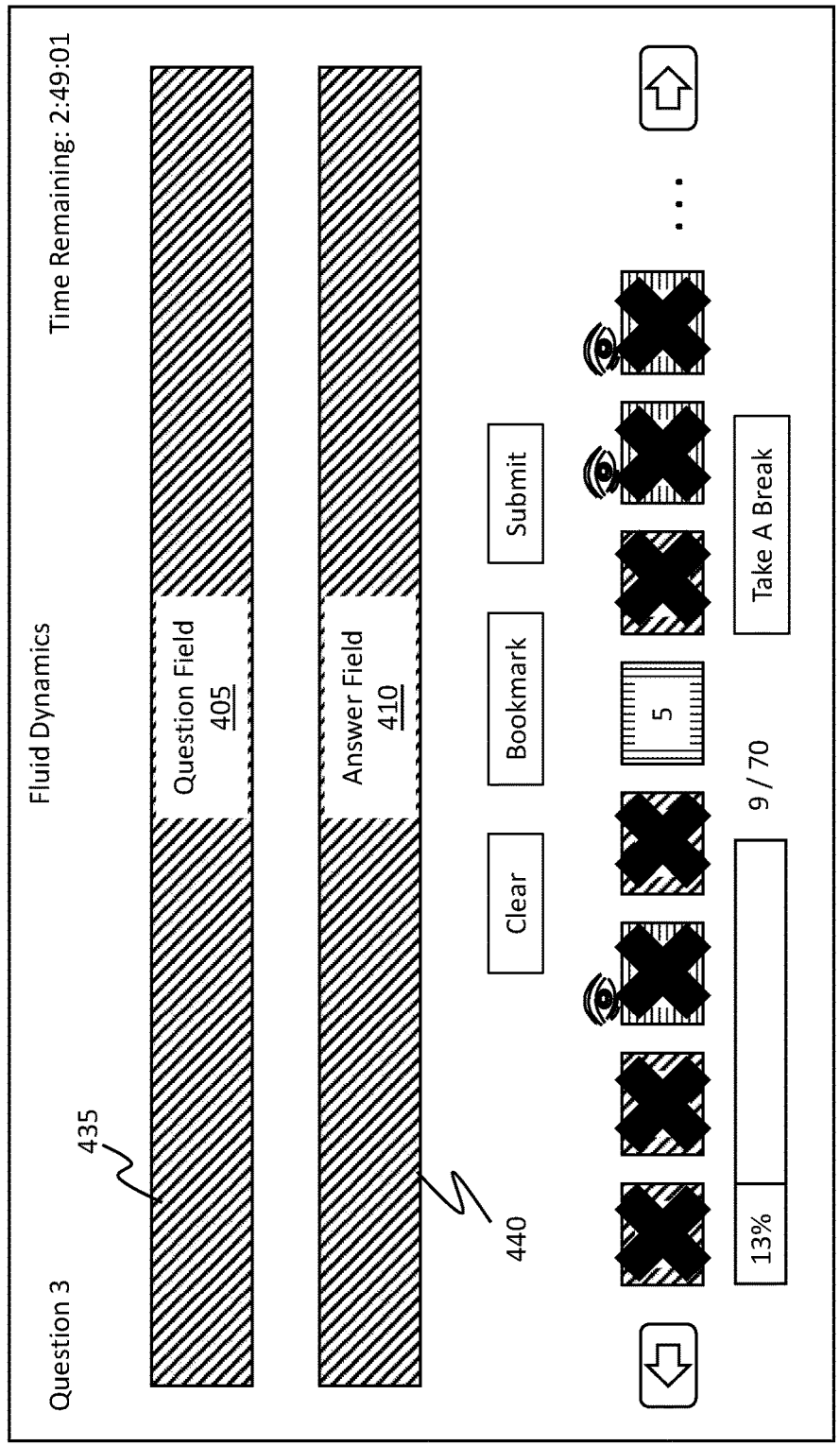

FIGS. 4A, 4B, and 4C illustrate a modified user interface that the testing application may display after a test taker returns from his/her break. The user interface is modified because, as discussed earlier, access to certain questions may now be restricted as a result of the break happening. For instance, questions having at least the viewed state (and potentially also the answered state) will have their access restricted in some manner. This restriction is beneficially imposed in an effort to prevent test takers from cheating, as described earlier.

FIG. 4A shows a user interface 400, which is similar to the user interface 100 of FIG. 1A. Notably, however, user interface 400 is displayed after or subsequent to a test taker completing his/her break (i.e. subsequent to a pause in the exam's administration or program flow). As shown in FIG. 4A, many of the UI elements are the same as between user interface 400 and user interface 100. One thing to note, in this particular example, the time remaining field continued to elapse while the test taker was on the break. Whereas previously the time remaining was 2:59:02, now the time remaining is 2:49:01 as a result of 00:10:01 elapsing during the break (e.g., as shown in FIG. 3B).

FIG. 4A illustrates an example scenario in which questions having the viewed state and the answered state are permitted to be navigated to and viewed, but the answer fields for those questions are restricted from being modified.

That is, the testing application prevents new content from being added to the answer field and prevents existing content from being deleted or modified. For example, user interface 400 is currently displaying Question 6 by showing the question field 405 and the answer field 410. Here, content included in the question field 405 is visible, and the test taker is not prevented from reviewing the question content. In contrast, content included in the answer field 410 is occluded, as represented by the leftward slanted lines. To clarify, regardless of whether an answer was previously provided or not provided in the answer field 410, the answer field 410 is configured to block content included therein from being visible and accessible.

In some cases, blocking the content includes displaying an opaque field on top of the answer field 410 or including hiding content in the answer field 410. In other cases, blocking the content includes preventing the answer field 410 from being displayed at all.

User interface 400 also includes a number of UI elements that reflect which questions are restricted. For instance, UI element 415 is an "X" overlapping the selectable numbered UI element corresponding to question "1." Similarly, UI element 420 is overlapping the element 2, and the UI element 425 is overlapping the element 3. Elements 4, 6, 7, and 8 also have overlapping elements. These elements are provided to visually indicate which questions are restricted in their viewing features. Element 5 does not have an overlapping element because question 5 still has an unviewed state. Because question 5 was not viewed prior to the test taker's break, the test taker did not know the subject matter of question 5 and thus his/her cheating opportunity with regard to question 5 is substantially reduced (e.g., the test taker would not know what subject matter to review while on the break). Accordingly, questions having the unviewed state will not have their access restricted and will not have an overlapping element to visually indicate the restricted status.

One will appreciate that the format or visual appearance of the UI elements 415, 420, 425 may be set to have any characteristic and are not limited to an "X" appearance. Indeed, any type of icon, element, or formatting may be used to indicate certain questions have been provided with special or restricted status. In some embodiments, the underlying selectable numbered UI element may have its visual appearance modified, such as by modifying its transparency. In any event, an indication is provided to visually identify which questions have restricted access.

FIG. 4B illustrates an alternative scenario. Whereas FIG. 4A represented a scenario in which the test taker was permitted to at least view questions having an answered state or a viewed state, FIG. 4B illustrates a scenario in which access to questions having an answered state or a viewed state is entirely restricted such that those questions are prevented from being viewed and modified.

Upon returning from the break, it may be beneficial to not automatically display a new question to the test taker. For instance, suppose the test taker returned from his/her break, but then immediately had an emergency. If the user interface were configured to automatically display a question that had not previously been viewed or answered, then that question would automatically be displayed and the state would immediately change to the viewed state. If the test taker then took a break, the test taker would lose the opportunity to answer that question (e.g., because its access would be restricted upon return from the break). Therefore, to prevent such occurrences from happing, the user interface shown in FIG. 4B may be displayed when the test taker returns from the break.

Instead of automatically displaying a next question, FIG. 4B shows an option 430 in which the user interface is instructing the test taker to select an available question to answer (e.g., in this case, perhaps question 5). By presenting this option 430, the test taker retains the ability to immediately take another break without adversely impacting his/her ability to answer questions. Accordingly, in the scenario presented in FIG. 4B, the test taker is provided with the option 430 to select a next question to review. Here, questions having the viewed state and the answered state prior to the break are restricted, and the testing application prevents both viewing and modification access to those questions.

FIG. 4C illustrates another scenario in which both the question field 405 and the answer field 410 are entirely occluded, as represented by occlusions 435 and 440, respectively. In this scenario, questions having the viewed state or the answered state prior to the break are now restricted. While those questions may be navigated to via the user interface, the content of the question field 405 and the content of the answer field 410 may be entirely blocked in any of the manners discussed earlier.

Additionally, or alternatively, some embodiments entirely restrict the ability to navigate to such questions. In these embodiments, questions 1, 2, 3, 4, 6, 7, and 8 would have their navigation abilities restricted such that those questions are prevented from being allowed to be navigated to. In other embodiments, however, they can be navigated to, but the content of those questions and answers is entirely blocked from being visible.

Method for Dynamically Controlling Program Flow of a Testing Application

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 5A:
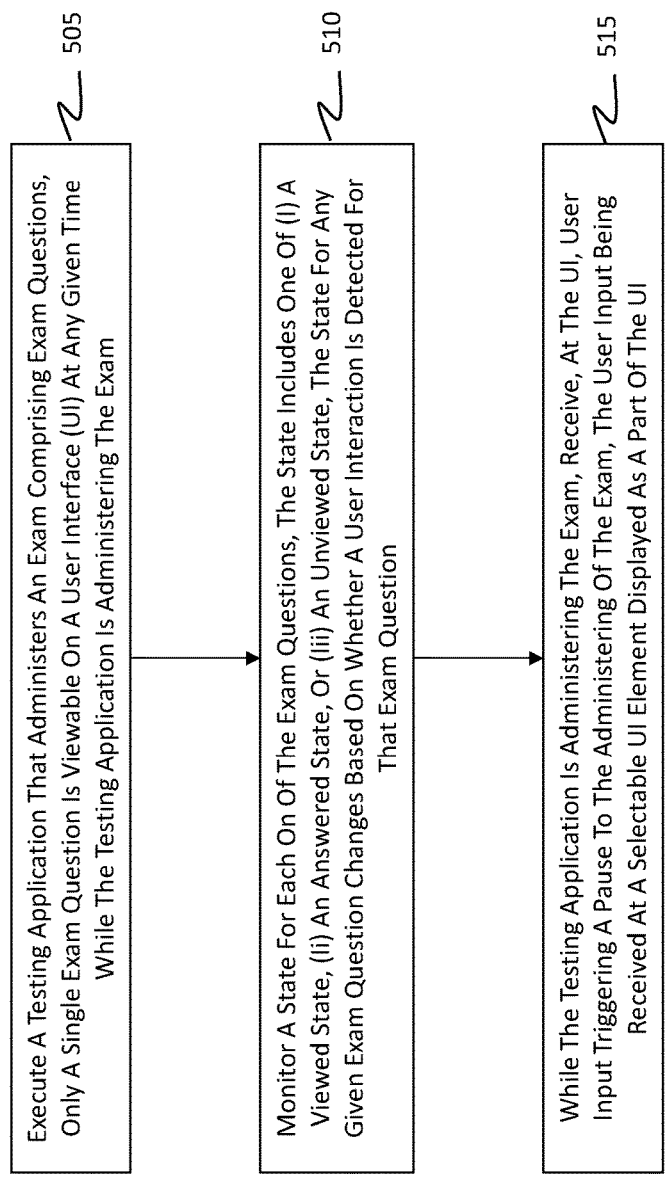
Figure 5B:
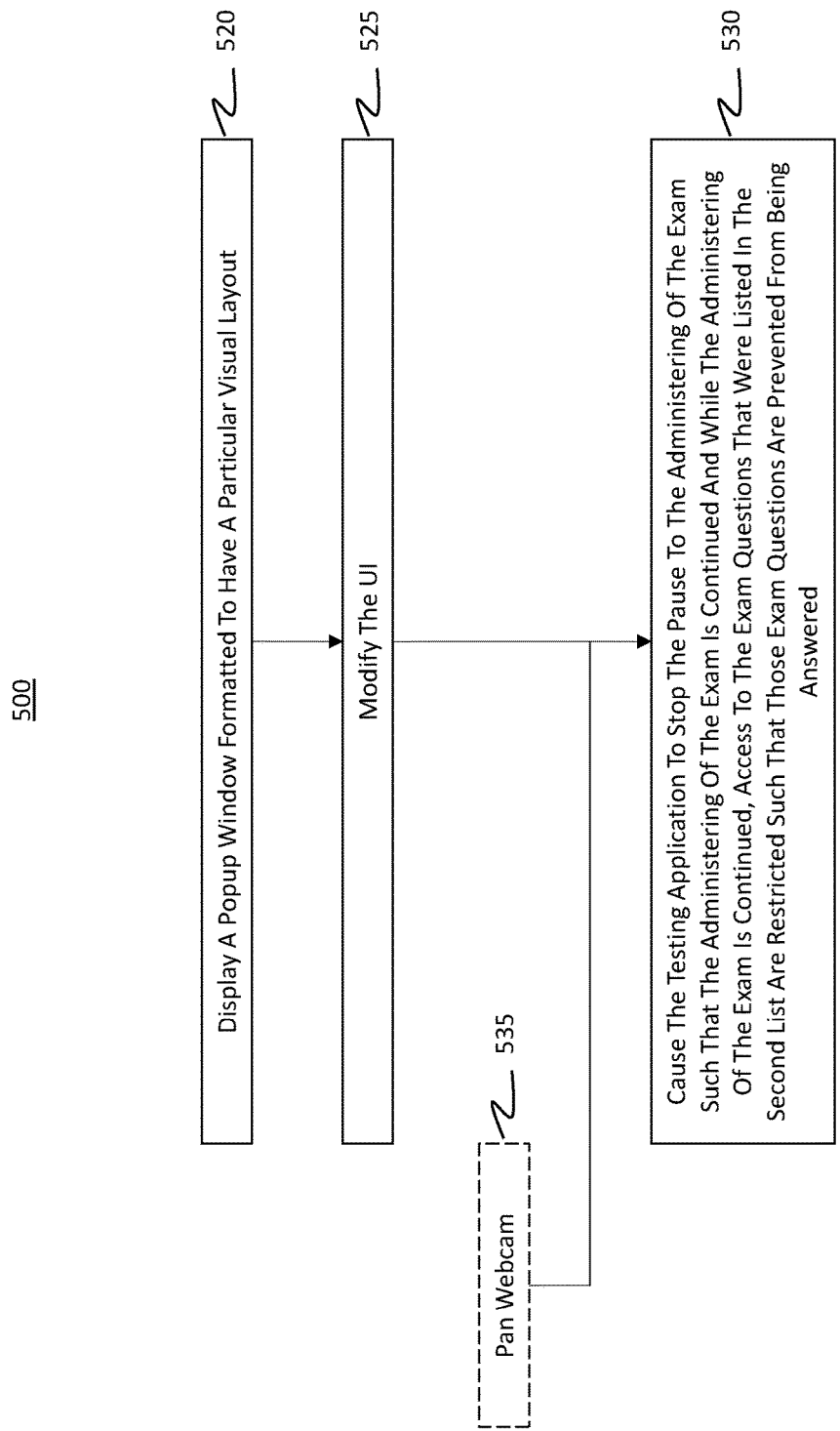

FIGS. 5A and 5B illustrate a flowchart of an example method 500 for dynamically controlling a program flow of a testing application that is being administered on a computing device. By controlling a "program flow," it is generally meant that the embodiments are able to configure a testing application to administer an exam and to pause the exam's administration.

Initially, method 500 includes an act (act 505) of executing a testing application that administers an exam comprising a plurality of exam questions. These exam questions are displayable on a user interface (UI). In some implementations, only a single exam question from the plurality of exam questions is viewable on a user interface (UI) at any given time while the testing application is administering the exam. In other implementations, multiple questions are simultaneously displayable on the UI at any given time.

UI 100 from FIG. 1A may be representative of the UI discussed in method act 505. Additionally, the testing application may be any of the testing applications discussed thus far. As described throughout this disclosure, in some embodiments, for each exam question having the "viewed" state, a viewed UI element (e.g., the eye elements 160A, 160B, or 160C from FIG. 1A) is displayed at a position proximate to each exam question's corresponding selectable numbered UI element in the UI. As a consequence, each exam question may be associated with both a particular format for the viewed state and with a "viewed" UI element.

Method 500 also includes an act (act 510) of monitoring a state for each exam question included in the plurality of exam questions. As described earlier, the state includes one of (i) a viewed state (e.g., viewed state 185 from FIG. 1B), (ii) an answered state (e.g., answered state 190 from FIG. 1B), or (iii) an unviewed state (e.g., unviewed state 195 from FIG. 1B). In some cases, the unviewed state is an initial default state (e.g., default state 195A from FIG. 1B) for each exam question in the plurality of exam questions. One will appreciate that the state for any given exam question changes based on whether a user interaction is detected for that exam question. For instance, if the user (i.e. the test taker) uses the UI to navigate to a particular exam question that had previously not been viewed, then that particular exam question's state will transition from having the unviewed state to having the viewed state. Once this transition occurs, the exam question's state will be prevented from being able to return to the unviewed state.

If the user enters an answer to the exam question, then the exam question's state will transition from the viewed state to the answered state. Once the exam question's state transitions to the answered state, the exam question's state may possibly be prevented from being able to transition to either one of the unviewed state or the viewed state. In a case where the test taker deletes an answer, it may be the case that the question's state transitions from the answered state to the viewed state, but it is always the case that the question's state will not transition back to the unviewed state.

While the testing application is administering the exam, there is an act (act 515) of receiving (e.g., at the UI) user input triggering a pause to the administering of the exam. This user input is received at a selectable UI element displayed as a part of the UI. By way of example, the selectable UI element may be the take a break 175 element illustrated in FIG. 1A. Additionally, the user input may be the user interaction 175A shown in FIG. 1A.

Method 500 continues in FIG. 5B. Specifically, in response to the UI input, method 500 includes an act (act 520) of displaying a popup window (e.g., perhaps popup window 200 from FIG. 2A) formatted to have a particular visual layout.

This particular visual layout includes any number of different items, some of which are outlined in FIG. 5C. For instance, FIG. 5C shows a visual layout 520A, which corresponds to the visual layout of the popup window mentioned in act 520.

In some implementations, visual layout 520A includes any one or any combination of the following: (i) a first list detailing a set of instructions to be followed (e.g., as shown by section 210 in FIG. 2A), as described by indicator 520B in FIG. 5C, (ii) a second list (e.g., list 215 in FIG. 2A) identifying any exam questions having the viewed state, as described by indicator 520C, and (iii) a confirmation UI element (e.g., either one of check box 220 or the yes option 225 in FIG. 2A) that, when selected, confirms user acknowledgement of the popup window, as shown by indicator 520D. By displaying the information in the popup window, the user/test taker will be made aware regarding which questions will have their access restricted once the user returns from the break.

Returning to FIG. 5B, subsequent to the confirmation UI element being selected confirming the user acknowledgement of the popup window, method 500 includes an act (act 525) of modifying the UI. For instance, the UIs shown in FIGS. 4A, 4B, and 4C are reflective of a "modified" UI, which are displayed after the user returns from the break (e.g., after the "Resume" 315 option is selected in FIG. 3A). In some cases, also subsequent to the confirmation UI element being selected confirming the user acknowledgement of the popup window and prior to the disclosed "resume" UI element being selected, an alert may be sent to a proctor computing device, as described in connection with FIG. 3C (e.g., the alarm 330). This alert or alarm indicates that the testing application will subsequently pause the administration of the exam. In some cases (e.g., as described in FIG. 3D), the testing application may be required to receive a permission notification (e.g., permission 360) from a proctor computing device prior to pausing the administration of the exam.

In any event, once the break is triggered, the process of modifying the UI may occur in a variety of different ways, as described in FIG. 5C. In particular, FIG. 5C lists a number of modifications 525A, which may be performed individually or as a combination. One of the modifications 525A includes occluding a visual display of any of the exam questions in the plurality of exam questions, as shown by label 525B. The occluding section 300A in FIG. 3A is representative of this type of modification.

Another one of the modifications 525A includes displaying a resume UI element that, when selected, causes the testing application to stop the pause to the administering of the exam, as shown by label 525C. As a consequence of stopping the pause, the administering of the exam is continued. The resume 315 element in FIG. 3A is representative of this type of modification.

Another one of the modifications 525A includes displaying a timing UI element that visually displays an amount of time the administering of the exam has been paused, as shown by label 525D in FIG. 5C. The timer 310 in FIG. 3A is representative of this type of modification.

Returning to FIG. 5B, subsequent to the resume UI element being selected, method 500 includes an act (act 530) of causing the testing application to stop the pause to the administering of the exam. Consequently, the administering of the exam is continued. Here, while the administering of the exam is continued, access to the exam questions that were listed in the second list (i.e. those questions that had the viewed state and potentially also those questions that had the answered state) are restricted such that those exam questions are prevented from being answered and possibly even from being viewed. To clarify, in some cases, the access is restricted by preventing those exam questions from being answered, but those exam questions are permitted to be viewed. In other cases, both viewing and answering privileges are removed. Additionally, the modified UIs described in FIGS. 4A-4C may be displayed as a part of this method act.

In some cases, prior to the testing application continuing with its administration of the exam, there is an act (act 535) in which a webcam is required to be panned around the area of the testing device (i.e. the computing device hosting the testing application). As described earlier, such an operation may be performed in an effort to ensure that contraband has not been brought back into the testing area. In some cases, the webcam may have been active throughout either the entire testing duration or perhaps throughout the entire paused duration. The video generated by the webcam (e.g., as a result of act 535) may be transmitted to a proctor device to enable a proctor to verify the testing area is free of contraband.

Example Testing Architectures

Figure 6B:
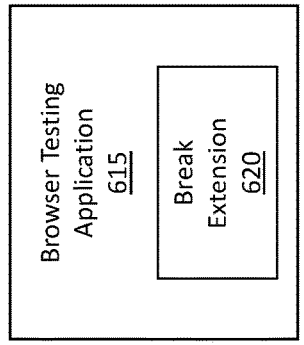
FIGS. 6A and 6B illustrate different computing architectures that may be used to implement the disclosed principles.
Figure 6A:
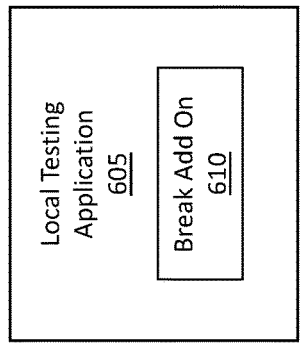

FIGS. 6A and 6B illustrate some example testing architectures that may be used to implement the disclosed principles. Specifically, FIG. 6A illustrates an architecture 600A where a local testing application 605 (i.e. an application is installed and is executing on a local device) includes a break add on 610. Break add on 610 may be any type of plug in component or add on that may be installed on a device to enhance the functionality of a program. In accordance with the disclosed embodiments, any type of local testing application 605 may be used to administer an exam. To enhance the functionality of this local testing application 605 (e.g., by including the beneficial UI elements and restrictive/controlling operations disclosed herein), the break add on 610 may be installed to add the disclosed features to the local testing application 605.

FIG. 6B, on the other hand, shows an architecture 600B implementing a web browser testing application 615. That is, the browser testing application 615 may be a cloud-based or network-based application executing on a remote computer. A client device (i.e. a test taker's device) is able to display a web browser, connect to a host, and display testing content (e.g., any of the disclosed UIs) in the browser. Some embodiments enhance existing browser testing applications by introducing an extension to that web browser application, as shown by break extension 620. Accordingly, the embodiments may be practiced in any type of platform or software application, without limit.

Some embodiments record events that occur during the exam's administration and/or during a break. This information may be recorded in the form of a log. As an example, in the event of a connectivity issue (e.g., loss of connection to the Internet), the embodiments are able to generate an event in the log to indicate the connectivity issue. The log may also include timing information with regard to a duration of a break and also frequency of breaks.

Accordingly, the disclosed embodiments bring about substantial benefits to the testing environment or testing technical field. The embodiments generally include an improved user interface that is configured to dynamically control a testing application's program flow. The UI is beneficially designed to improve the user's interaction with the testing application and with the computer system in general. Accordingly, substantial benefits may be realized through practice of the disclosed principles.

Example Computer/Computer Systems

Figure 7:
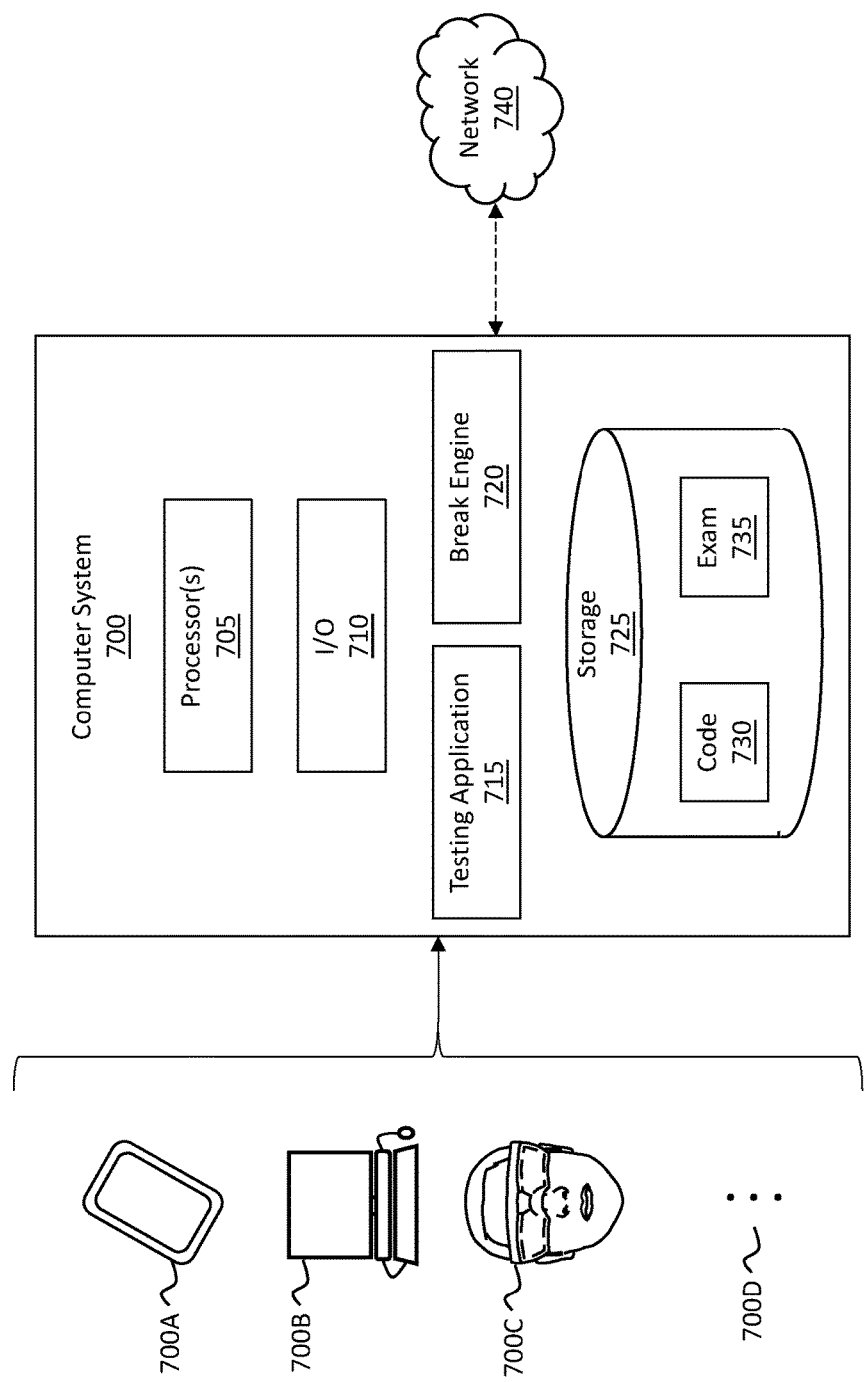
FIG. 7 illustrates an example of a computer system that may be structured or configured to perform any of the disclosed operations.

Attention will now be directed to FIG. 7 which illustrates an example computer system 700 that may include and/or be used to perform any of the operations described herein. Computer system 700 may take various different forms. For example, computer system 700 may be embodied as a tablet, a desktop, a laptop, a mobile device, or a standalone device, such as those described throughout this disclosure. Computer system 700 may also be a distributed system that includes one or more connected computing components/devices that are in communication with computer system 700.

FIG. 7 specifically calls out how computer system 700 may be embodied as a tablet 700A, a laptop 700B, or a wearable headset device 700C, but the ellipsis 700D illustrates how computer system 700 may be embodied in other forms as well. Regarding the wearable headset device 700C, this device may be any type of virtual or augmented reality device. A student is able to wear the wearable headset device 700C while being examined. In some cases, the exam questions and/or additional exam-related content may be visually displayed by the wearable headset device 700C in the form of holograms, three-dimensional visual content, or other virtual or augmented reality content.

In its most basic configuration, computer system 700 includes various different components. FIG. 7 shows that computer system 700 includes one or more processor(s) 705 (aka a "hardware processing unit"), input/output (I/O) 710, a testing application 715, a break engine 720, and storage 725.

Regarding the processor(s) 705, it will be appreciated that the functionality described herein can be performed, at least in part, by one or more hardware logic components (e.g., the processor(s) 705). For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

The I/O 710 may include any type of input or output device. Examples include, but are not limited to, any type of keyboard, mouse, stylus, display, audio recording device, video recording device (e.g., the webcam mentioned earlier), and so forth. Indeed, any device (e.g., either wired or wireless) capable of producing or receiving input or output should be included in the I/O 710.

The testing application 715 is representative of the testing applications mentioned throughout this disclosure. In some cases, the testing application 715 may be a locally executable application while in other cases the testing application 715 is executed on a host computer system and made available on a client computer system, as described earlier. The break engine 720 may be any type of add-on, plugin, or executable feature that may be included or added on to the testing application 715 to provide the disclosed operations.

The testing application 715 and/or the break engine 720 may be implemented as a specific processing unit (e.g., a dedicated processing unit as described earlier) configured to perform one or more specialized operations for the computer system 700. As used herein, the terms "executable module," "executable component," "component," "module," "engine," or "application" can refer to hardware processing units or to software objects, routines, or methods that may be executed on computer system 700. The different components, modules, engines, applications, and services described herein may be implemented as objects or processors that execute on computer system 700 (e.g. as separate threads). The testing application 715 and/or the break engine 720 (or perhaps even just the processor(s) 705) can be configured to perform any of the disclosed method acts or other functionalities.

Storage 725 may be physical system memory, which may be volatile, non-volatile, or some combination of the two. The term "memory" may also be used herein to refer to non-volatile mass storage such as physical storage media. If computer system 700 is distributed, the processing, memory, and/or storage capability may be distributed as well.

Storage 725 is shown as including executable instructions (i.e. code 730). The executable instructions represent instructions that are executable by the processor(s) 705 (or perhaps even the testing application 715 and/or the break engine 720) of computer system 700 to perform the disclosed operations, such as those described in the various methods. The storage 725 is also shown as including an exam 735. Exam 735 is representative of the exams disclosed herein and may include any number or type of exam questions that are to be administered. In some cases, exam 735 may not be stored locally on a test taker's device but is instead stored remotely (while being accessible to the test taker's device).

The disclosed embodiments may comprise or utilize a special-purpose or general-purpose computer including computer hardware, such as, for example, one or more processors (such as processor(s) 705) and system memory (such as storage 725), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Computer-readable media that carry computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 700 may also be connected (via a wired or wireless connection) to external sensors (e.g., one or more remote cameras) or devices via a network 740. For example, computer system 700 can communicate with any number devices (e.g., the proctor devices mentioned earlier) or cloud services to obtain or process data. In some cases, network 740 may itself be a cloud network. Furthermore, computer system 700 may also be connected through one or more wired or wireless networks to remote/separate computer systems(s) that are configured to perform any of the processing described with regard to computer system 700.

A "network," like network 740, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 700 will include one or more communication channels that are used to communicate with the network 740. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for dynamically controlling a program flow of a testing application that is being administered on a computing device, said method comprising:

executing a testing application that administers an exam comprising a plurality of exam questions, wherein each exam question in the plurality of exam questions is displayable on a user interface (UI);

monitoring a state for each exam question included in the plurality of exam questions, wherein the state includes one of (i) a viewed state, wherein the viewed state indicates that a particular exam question has been viewed but not yet answered (ii) an answered state, or (iii) an unviewed state, and wherein the state for any given exam question changes based on whether a user interaction is detected for said any given exam question;

while the testing application is administering the exam, receiving, at the UI, user input triggering a pause to the administering of the exam, the user input being received at a selectable UI element displayed as a part of the UI;

in response to the user input, displaying a popup window formatted to have a particular visual layout, the particular visual layout including (i) a first list detailing a set of instructions to be followed, (ii) a second list identifying a plurality of exam questions having the viewed state, and (iii) a confirmation UI element that, when selected, confirms user acknowledgement of the popup window;

subsequent to the confirmation UI element being selected, modifying the UI by occluding a visual display of any of the exam questions in the plurality of exam questions, by displaying a resume UI element that, when selected, causes the testing application to stop the pause to the administering of the exam such that the administering of the exam is continued, and by displaying a timing UI element that visually displays an amount of time the administering of the exam has been paused; and subsequent to the resume UI element being selected, causing the testing application to stop the pause to the administering of the exam such that the administering of the exam is continued, wherein, while the administering of the exam is continued, access to the exam questions that were listed in the second list are restricted such that those exam questions are prevented from being answered.

2. The method of claim 1, wherein the answered state indicates that the particular exam question has both been viewed and answered, and wherein the unviewed state indicates that the particular exam question has not yet been viewed or answered.

3. The method of claim 1, wherein the UI comprises a specific layout, the specific layout comprising:
a navigation bar displaying selectable numbered UI elements corresponding to at least some exam questions included in the plurality of exam questions,
wherein a format for each displayed selectable numbered UI element reflects a particular state for a corresponding exam question, and
wherein a format for the viewed state is different than a format for the answered state and is different than a format for the unviewed state.

4. The method of claim 1, wherein access to the exam questions that were listed in the second list is restricted by preventing those exam questions from being viewed and answered.

5. The method of claim 1, wherein access to the exam questions that were listed in the second list is restricted by preventing those exam questions from being answered but those exam questions are permitted to be viewed.

6. The method of claim 1, wherein the particular visual layout of the popup window further includes a third list identifying any exam questions having the answered state, and
wherein, in addition to restricting access to the exam questions that were listed in the second list, access to the exam questions listed in the third list are also restricted.

7. The method of claim 1, wherein the UI comprises a specific layout, the specific layout comprising:
a navigation bar displaying selectable numbered UI elements corresponding to at least some exam questions included in the plurality of exam questions,
wherein a format for each displayed selectable numbered UI element reflects a particular state for a corresponding exam question,
wherein a format for the viewed state is different than a format for the answered state and is different than a format for the unviewed state, and
for each exam question having the viewed state, a viewed UI element is displayed at a position proximate to said each exam question's corresponding selectable numbered UI element such that said each exam question is associated with the format for the viewed state and the viewed UI element.

8. The method of claim 7, wherein the position of the viewed UI element at least partially overlaps said each exam question's corresponding selectable numbered UI element.

9. The method of claim 1, wherein the method further includes:
subsequent to the confirmation UI element being selected confirming the user acknowledgement of the popup window and prior to the resume UI element being selected, sending an alert to a proctor computing device, the alert indicating that the testing application will subsequently pause the administering of the exam.

10. The method of claim 9, wherein the testing application is required to receive a permission notification from the proctor computing device prior to pausing the administering of the exam.

11. A computer system comprising:
one or more processors; and
one or more computer-readable hardware storage devices having stored thereon computer-executable instructions that are executable by the one or more processors to cause the computer system to at least:
execute a testing application that administers an exam comprising a plurality of exam questions, wherein each exam question in the plurality of exam questions is displayable on a user interface (UI);
monitor a state for each exam question included in the plurality of exam questions, wherein the state includes one of (i) a viewed state, wherein the viewed state indicates that a particular exam question has been viewed but not yet answered (ii) an answered state, or (iii) an unviewed state, and wherein the state for any given exam question changes based on whether a user interaction is detected for said any given exam question;
while the testing application is administering the exam, receive, at the UI, user input triggering a pause to the administering of the exam, the user input being received at a selectable UI element displayed as a part of the UI;
in response to the UI input, display a popup window formatted to have a particular visual layout, the particular visual layout including (i) a first list detailing a set of instructions to be followed, (ii) a second list identifying a plurality of exam questions having the viewed state, and (iii) a confirmation UI element that, when selected, confirms user acknowledgement of the popup window;
subsequent to the confirmation UI element being selected confirming the user acknowledgement of the popup window, modify the UI by occluding a visual display of any of the exam questions in the plurality of exam questions, by displaying a resume UI element that, when selected, causes the testing application to stop the pause to the administering of the exam such that the administering of the exam is continued, and by displaying a timing UI element that visually displays an amount of time the administering of the exam has been paused; and subsequent to the resume UI element being selected, cause the testing application to stop the pause to the administering of the exam such that the administering of the exam is continued, wherein, while the administering of the exam is continued, access to the exam questions that were listed in the second list are restricted such that those exam questions are prevented from being answered.

12. The computer system of claim 11, wherein the answered state indicates that the particular exam question has both been viewed and answered, and wherein the unviewed state indicates that the particular exam question has not yet been viewed or answered.

13. The computer system of claim 11, wherein the UI comprises a specific layout, the specific layout comprising:
a navigation bar displaying selectable numbered UI elements corresponding to at least some exam questions included in the plurality of exam questions, wherein a format for each displayed selectable numbered UI element reflects a particular state for a corresponding exam question, and
wherein a format for the viewed state is different than a format for the answered state and is different than a format for the unviewed state.

14. The computer system of claim 11, wherein access to the exam questions that were listed in the second list is restricted by preventing those exam questions from being viewed and answered.

15. The computer system of claim 11, wherein access to the exam questions that were listed in the second list is restricted by preventing those exam questions from being answered but those exam questions are permitted to be viewed.

16. The computer system of claim 11, wherein the particular visual layout of the popup window further includes a third list identifying any exam questions having the answered state, and
wherein, in addition to restricting access to the exam questions that were listed in the second list, access to the exam questions listed in the third list are also restricted.

17. The computer system of claim 11, wherein execution of the computer-executable instructions further causes the computer system to:
subsequent to the confirmation UI element being selected confirming the user acknowledgement of the popup window and prior to the resume UI element being selected, sending an alert to a proctor computing device, the alert indicating that the testing application will subsequently pause the administering of the exam.

18. The computer system of claim 17, wherein the testing application is required to receive a permission notification from the proctor computing device prior to pausing the administering of the exam.

19. One or more hardware storage devices having stored thereon computer-executable instructions that are executable by one or more processors of a computer system to cause the computer system to at least:
execute a testing application that administers an exam comprising a plurality of exam questions, wherein each exam question in the plurality of exam questions is displayable on a user interface (UI);
monitor a state for each exam question included in the plurality of exam questions, wherein the state includes one of (i) a viewed state, wherein the viewed state indicates that a particular exam question has been viewed but not yet answered (ii) an answered state, or (iii) an unviewed state, and wherein the state for any given exam question changes based on whether a user interaction is detected for said any given exam question;
while the testing application is administering the exam, receive, at the UI, user input triggering a pause to the administering of the exam, the user input being received at a selectable UI element displayed as a part of the UI;
in response to the UI input, display a popup window formatted to have a particular visual layout, the particular visual layout including (i) a first list detailing a set of instructions to be followed, (ii) a second list identifying a plurality of exam questions having the viewed state, and (iii) a confirmation UI element that, when selected, confirms user acknowledgement of the popup window;
subsequent to the confirmation UI element being selected confirming the user acknowledgement of the popup window, modify the UI by occluding a visual display of any of the exam questions in the plurality of exam questions, by displaying a resume UI element that, when selected, causes the testing application to stop the pause to the administering of the exam such that the administering of the exam is continued, and by displaying a timing UI element that visually displays an amount of time the administering of the exam has been paused; and
subsequent to the resume UI element being selected, cause the testing application to stop the pause to the administering of the exam such that the administering of the exam is continued, wherein, while the administering of the exam is continued, access to the exam questions that were listed in the second list are restricted such that those exam questions are prevented from being answered.

20. The one or more hardware storage devices of claim 19, wherein the answered state indicates that the particular exam question has both been viewed and answered, and wherein the unviewed state indicates that the particular exam question has not yet been viewed or answered.

\* \* \* \* \*